(12) United States Patent
Smith

(10) Patent No.: US 11,353,117 B1
(45) Date of Patent: Jun. 7, 2022

(54) VALVE SEAT INSERT SYSTEM AND METHOD

(71) Applicant: Vulcan Industrial Holdings, LLC, Houston, TX (US)

(72) Inventor: Jason David Smith, Porter, TX (US)

(73) Assignee: Vulcan Industrial Holdings, LLC, Houston, TX (US)

( * ) Notice: Subject to any disclaimer, the term of this patent is extended or adjusted under 35 U.S.C. 154(b) by 0 days.

(21) Appl. No.: 16/917,083

(22) Filed: Jun. 30, 2020

Related U.S. Application Data

(63) Continuation-in-part of application No. 16/746,519, filed on Jan. 17, 2020, now Pat. No. 10,774,828.

(51) Int. Cl.
   *F16K 1/42* (2006.01)
   *F16K 25/00* (2006.01)
   (Continued)

(52) U.S. Cl.
   CPC ............... *F16K 1/42* (2013.01); *F16K 15/06* (2013.01); *F16K 25/005* (2013.01);
   (Continued)

(58) Field of Classification Search
   CPC ......... Y10T 137/7904; Y10T 137/7929; Y10T 137/7559; Y10T 137/86019; F16K 1/42;
   (Continued)

(56) References Cited

U.S. PATENT DOCUMENTS

| 1,576,269 A | 3/1926 | Durant |
| 1,595,459 A | 8/1926 | Durant |

(Continued)

FOREIGN PATENT DOCUMENTS

| CN | 201149099 | ‡ 11/2008 |
| CN | 102410194 | ‡ 4/2012 |

(Continued)

OTHER PUBLICATIONS

Weir Oil & Gas, "SPM Well Service Pumps & Flow Control Products TWS600S Fluid End Operation Instruction and Service Manual," Feb. 27, 2017, https://www.global.weir/assets/files/oil%20and%20gas%20ebrochures/manuals/tws600s-fluid-end-2p121260.pdf, 41 pages.‡

(Continued)

*Primary Examiner* — Craig M Schneider
*Assistant Examiner* — Frederick D Soski
(74) *Attorney, Agent, or Firm* — Hogan Lovells US LLP

(57) ABSTRACT

A valve assembly for a fracturing pump includes a valve seat having a bore, the valve seat having an upper region forming at least a portion of a strike face. The valve assembly also includes a groove and a valve seat insert positioned within the bore. The valve seat insert includes a body portion extending at least a portion of a bore length. The valve seat insert also includes an insert bore extending through the body portion. The valve seat insert further includes an upper insert region, at least a portion of the upper insert region positioned within the groove. The valve assembly also includes a valve member positioned to reciprocate within the bore, the valve member moving between an open position and a closed position.

13 Claims, 8 Drawing Sheets

(51) Int. Cl.
*F16K 15/06* (2006.01)
*E21B 43/26* (2006.01)
*F04B 53/10* (2006.01)

(52) U.S. Cl.
CPC ....... *E21B 43/2607* (2020.05); *F04B 53/1025* (2013.01); *F04B 53/1087* (2013.01); *Y10T 137/7559* (2015.04); *Y10T 137/7909* (2015.04); *Y10T 137/7929* (2015.04); *Y10T 137/86019* (2015.04)

(58) Field of Classification Search
CPC .... F16K 15/06; F16K 25/005; E21B 43/2607; F04B 53/1025; F04B 53/1087
See application file for complete search history.

(56) References Cited

U.S. PATENT DOCUMENTS

| | | | | |
|---|---|---|---|---|
| 1,671,139 A ‡ | 5/1928 | Wilson | ................ | F16K 1/34 251/33 |
| 1,873,318 A ‡ | 8/1932 | Eason, Jr. | ............ | F04B 53/1027 137/533.21 |
| 1,914,737 A ‡ | 6/1933 | Elms | .................. | F04B 53/1027 251/175 |
| 1,948,628 A ‡ | 2/1934 | Penick | ................ | F04B 53/1027 251/332 |
| 1,963,684 A | 6/1934 | Shimer | | |
| 1,963,685 A | 6/1934 | Shimer | | |
| 2,011,547 A ‡ | 8/1935 | Joseph | ................ | F04B 53/1027 137/516.29 |
| 2,069,443 A | 2/1937 | Hill | | |
| 2,103,503 A ‡ | 12/1937 | White | ................ | F04B 53/1027 137/329.04 |
| 2,103,504 A | 12/1937 | White | | |
| 2,143,399 A ‡ | 1/1939 | Abercrombie | ...... | F04B 53/1022 137/540 |
| 2,304,991 A ‡ | 12/1942 | Foster | ................ | F04B 53/1027 137/454.4 |
| 2,506,128 A ‡ | 5/1950 | Ashton | ................ | F16K 31/143 251/12 |
| 2,547,831 A ‡ | 4/1951 | Mueller | ............... | F16K 3/0227 251/17 |
| 2,713,522 A | 7/1955 | Lorenz | | |
| 2,719,737 A | 10/1955 | Fletcher | | |
| 2,745,631 A ‡ | 5/1956 | Shellman | ............ | F04B 53/1027 251/175 |
| 2,756,960 A | 7/1956 | Church | | |
| 2,898,082 A ‡ | 8/1959 | Russell | ............... | F04B 53/1027 251/333 |
| 2,969,951 A ‡ | 1/1961 | Walton | ............... | F04B 53/1027 251/332 |
| 2,982,515 A ‡ | 5/1961 | Rule | ....................... | F16K 1/465 251/332 |
| 2,983,281 A ‡ | 5/1961 | Bynum | ............... | F04B 53/1087 137/543.23 |
| 3,049,082 A | 8/1962 | Barry | | |
| 3,053,500 A | 9/1962 | Atkinson | | |
| 3,063,467 A ‡ | 11/1962 | Roberts, Jr. | ............. | F16K 1/465 137/516.29 |
| 3,224,817 A ‡ | 12/1965 | Carter | ................... | F16J 15/186 384/16 |
| 3,276,390 A ‡ | 10/1966 | Bloudoff | ................ | F04B 53/14 92/61 |
| 3,288,475 A | 11/1966 | Benoit | | |
| 3,459,363 A | 8/1969 | Miller | | |
| 3,474,808 A ‡ | 10/1969 | Elliott | .................. | F16K 15/063 137/543 |
| 3,483,885 A | 12/1969 | Leathers | | |
| 3,489,098 A | 1/1970 | Roth | | |
| 3,489,170 A ‡ | 1/1970 | Leman | ................... | F16K 1/385 137/516.29 |
| 3,512,787 A | 5/1970 | Kennedy | | |
| 3,809,508 A ‡ | 5/1974 | Uchiyama | ............ | F04B 53/164 417/51 |
| 3,907,307 A | 9/1975 | Maurer | | |
| 3,931,755 A | 1/1976 | Hatridge | | |
| 4,044,834 A ‡ | 8/1977 | Perkins | .................. | E21B 21/08 166/370 |
| 4,076,212 A ‡ | 2/1978 | Leman | ...................... | F16K 1/46 137/516.29 |
| 4,184,814 A ‡ | 1/1980 | Parker | ................. | F04B 53/1027 137/454.4 |
| 4,219,204 A | 8/1980 | Pippert | | |
| 4,277,229 A | 7/1981 | Pacht | | |
| 4,331,741 A | 5/1982 | Wilson | | |
| 4,395,050 A | 7/1983 | Wirz | | |
| 4,398,731 A | 8/1983 | Gorman | | |
| 4,440,404 A | 4/1984 | Roach | | |
| 4,508,133 A | 4/1985 | Hamid | | |
| 4,518,329 A ‡ | 5/1985 | Weaver | ............... | F04B 53/1027 137/516.25 |
| 4,518,359 A | 5/1985 | Yao-Psong | | |
| 4,527,806 A | 7/1985 | Ungchusri | | |
| 4,662,392 A ‡ | 5/1987 | Vadasz | .................... | F16K 15/04 137/53 |
| 4,754,950 A | 7/1988 | Tada | | |
| 4,763,876 A ‡ | 8/1988 | Oda | ........................ | F01L 3/22 123/18 |
| 4,770,206 A ‡ | 9/1988 | Sjoberg | ............... | F04B 53/1027 137/516.29 |
| 4,807,890 A | 2/1989 | Gorman | | |
| 4,811,758 A | 3/1989 | Piper | | |
| 4,861,241 A | 8/1989 | Gamboa | | |
| 4,919,719 A | 4/1990 | Abe | | |
| 4,951,707 A ‡ | 8/1990 | Johnson | .................... | F16K 1/46 137/516.29 |
| 5,020,490 A ‡ | 6/1991 | Seko | ........................ | F01L 3/22 123/188.8 |
| 5,052,435 A ‡ | 10/1991 | Crudup | ................ | F16K 15/063 137/516.29 |
| 5,061,159 A ‡ | 10/1991 | Pryor | ................. | F04B 53/1002 417/55 |
| 5,062,450 A ‡ | 11/1991 | Bailey | ..................... | E21B 33/13 137/516.29 |
| 5,080,713 A | 1/1992 | Ishibashi | | |
| 5,088,521 A ‡ | 2/1992 | Johnson | .................. | E21B 21/01 137/516.29 |
| 5,127,807 A | 7/1992 | Eslinger | | |
| 5,131,666 A | 7/1992 | Hutchens | | |
| 5,149,107 A | 9/1992 | Maringer | | |
| 5,209,495 A ‡ | 5/1993 | Palmour | .............. | F04B 53/164 277/50 |
| 5,249,600 A ‡ | 10/1993 | Blume | ................ | F04B 53/1087 137/516.29 |
| 5,267,736 A | 12/1993 | Pietsch | | |
| 5,273,570 A | 12/1993 | Sato | | |
| 5,314,659 A | 5/1994 | Hidaka | | |
| 5,478,048 A | 12/1995 | Salesky | | |
| 5,533,245 A ‡ | 7/1996 | Stanton | .................... | B25B 27/06 29/213.1 |
| 5,540,570 A ‡ | 7/1996 | Schuller | ................ | B60T 8/4031 417/54 |
| 5,626,345 A | 5/1997 | Wallace | | |
| 5,636,688 A | 6/1997 | Bassinger | | |
| 5,674,449 A | 10/1997 | Liang | | |
| 5,834,664 A | 11/1998 | Aonuma | | |
| 5,859,376 A | 1/1999 | Ishibashi | | |
| 5,895,517 A | 4/1999 | Kawamura | | |
| 5,949,003 A | 9/1999 | Aoki | | |
| 6,139,599 A | 10/2000 | Takahashi | | |
| 6,200,688 B1 | 3/2001 | Liang | | |
| 6,328,312 B1 | 12/2001 | Schmitz | | |
| 6,340,377 B1 | 1/2002 | Kawata | | |
| 6,382,940 B1 ‡ | 5/2002 | Blume | .................. | F04B 53/007 277/43 |
| 6,436,338 B1 | 8/2002 | Qiao | | |
| 6,460,620 B1 ‡ | 10/2002 | LaFleur | ................. | E21B 21/106 137/881 |
| 6,464,749 B1 | 10/2002 | Kawase | | |
| 6,482,275 B1 | 11/2002 | Qiao | | |
| 6,485,678 B1 | 11/2002 | Liang | | |

(56) References Cited

U.S. PATENT DOCUMENTS

| | | | |
|---|---|---|---|
| 6,544,012 B1 | 4/2003 | Blume | |
| 6,623,259 B1 ‡ | 9/2003 | Blume | F04B 53/007 |
| | | | 137/543.23 |
| 6,641,112 B2 ‡ | 11/2003 | Antoff | F04B 53/1025 |
| | | | 251/363 |
| 6,695,007 B2 ‡ | 2/2004 | Vicars | F16K 15/063 |
| | | | 137/516.29 |
| 6,702,905 B1 | 3/2004 | Qiao | |
| 6,880,802 B2 | 4/2005 | Hara | |
| 6,910,871 B1 | 6/2005 | Blume | |
| 6,916,444 B1 | 7/2005 | Liang | |
| 6,951,165 B2 ‡ | 10/2005 | Kuhn | F04B 1/0426 |
| | | | 92/129 |
| 6,951,579 B2 | 10/2005 | Koyama | |
| 6,955,181 B1 ‡ | 10/2005 | Blume | F16K 15/06 |
| | | | 137/15.18 |
| 6,959,916 B2 | 11/2005 | Chigasaki | |
| 7,000,632 B2 | 2/2006 | McIntire | |
| 7,036,824 B2 | 5/2006 | Kunz | |
| 7,144,440 B2 | 12/2006 | Ando | |
| 7,168,440 B1 ‡ | 1/2007 | Blume | F04B 53/102 |
| | | | 137/15.18 |
| 7,186,097 B1 ‡ | 3/2007 | Blume | F04B 53/007 |
| | | | 417/45 |
| 7,222,837 B1 ‡ | 5/2007 | Blume | F16K 1/385 |
| | | | 137/516.29 |
| 7,290,560 B2 | 11/2007 | Orr | |
| 7,296,591 B2 ‡ | 11/2007 | Moe | F04B 53/109 |
| | | | 137/454.4 |
| 7,335,002 B2 | 2/2008 | Vicars | |
| 7,341,435 B2 ‡ | 3/2008 | Vicars | F04B 53/007 |
| | | | 137/51 |
| 7,506,574 B2 ‡ | 3/2009 | Jensen | F04B 53/007 |
| | | | 417/45 |
| 7,513,483 B1 ‡ | 4/2009 | Blume | F16K 1/34 |
| | | | 137/516.29 |
| 7,513,759 B1 | 4/2009 | Blume | |
| 7,611,590 B2 | 11/2009 | Liang | |
| 7,681,589 B2 | 3/2010 | Schwegman | |
| 7,682,471 B2 | 3/2010 | Levin | |
| 7,726,026 B1 ‡ | 6/2010 | Blume | F16K 1/465 |
| | | | 29/890 |
| 7,754,142 B2 | 7/2010 | Liang | |
| 7,754,143 B2 | 7/2010 | Qiao | |
| 7,757,396 B2 | 7/2010 | Sawada | |
| 7,789,133 B2 | 9/2010 | McGuire | |
| 7,793,913 B2 | 9/2010 | Hara | |
| 7,828,053 B2 | 11/2010 | McGuire | |
| 7,845,413 B2 | 12/2010 | Shampine | |
| 7,861,738 B2 | 1/2011 | Erbes | |
| 7,866,346 B1 ‡ | 1/2011 | Walters | F04B 53/16 |
| | | | 138/89 |
| 7,891,374 B2 | 2/2011 | Vicars | |
| 7,954,510 B2 | 6/2011 | Schwegman | |
| 7,992,635 B2 ‡ | 8/2011 | Cherewyk | E21B 43/26 |
| | | | 166/75.15 |
| 8,069,923 B2 ‡ | 12/2011 | Blanco et al. | F04B 53/22 |
| | | | 166/30 |
| 8,075,661 B2 | 12/2011 | Chen | |
| 8,083,506 B2 ‡ | 12/2011 | Maki | F04B 5/02 |
| | | | 417/56 |
| 8,100,407 B2 | 1/2012 | Stanton | |
| 8,141,849 B1 | 3/2012 | Blume | |
| 8,181,970 B2 | 5/2012 | Smith | |
| 8,261,771 B2 | 9/2012 | Witkowski | |
| 8,287,256 B2 | 10/2012 | Shafer | |
| 8,291,927 B2 | 10/2012 | Johnson | |
| 8,317,498 B2 * | 11/2012 | Gambier | F04B 49/243 |
| | | | 417/454 |
| 8,375,980 B2 | 2/2013 | Higashiyama | |
| 8,376,723 B2 | 2/2013 | Kugelev | |
| 8,402,880 B2 ‡ | 3/2013 | Patel | F04B 53/16 |
| | | | 92/165 |
| 8,430,075 B2 | 4/2013 | Qiao | |
| D687,125 S | 7/2013 | Hawes | |
| 8,479,700 B2 | 7/2013 | Qiao | |
| 8,528,585 B2 ‡ | 9/2013 | McGuire | F16L 37/088 |
| | | | 137/315.01 |
| 8,534,691 B2 | 9/2013 | Schaffer | |
| 8,613,886 B2 | 12/2013 | Qiao | |
| D700,682 S * | 3/2014 | Bayyouk | D23/233 |
| 8,662,864 B2 | 3/2014 | Bayyouk | |
| 8,662,865 B2 | 3/2014 | Bayyouk | |
| 8,668,470 B2 | 3/2014 | Bayyouk | |
| 8,707,853 B1 | 4/2014 | Dille | |
| 8,733,313 B2 | 5/2014 | Sato | |
| 8,828,312 B2 | 9/2014 | Yao | |
| 8,870,554 B2 ‡ | 10/2014 | Kent | F04B 49/10 |
| | | | 137/375 |
| 8,893,806 B2 | 11/2014 | Williamson | |
| 8,940,110 B2 | 1/2015 | Qiao | |
| 8,978,695 B2 | 3/2015 | Witkowkski | |
| 8,998,593 B2 | 4/2015 | Vicars | |
| 9,010,412 B2 | 4/2015 | McGuire | |
| 9,103,448 B2 | 8/2015 | Witkowski | |
| 9,150,945 B2 | 10/2015 | Bei | |
| 9,157,136 B2 | 10/2015 | Chou | |
| 9,157,468 B2 | 10/2015 | Dille | |
| 9,206,910 B2 | 12/2015 | Kahn | |
| D748,228 S | 1/2016 | Bayyouk | |
| 9,260,933 B2 | 2/2016 | Artherholt | |
| 9,261,195 B2 | 2/2016 | Toynbee | |
| 9,273,543 B2 | 3/2016 | Baca | |
| 9,284,631 B2 | 3/2016 | Radon | |
| 9,285,040 B2 ‡ | 3/2016 | Forrest | B05B 9/0413 |
| 9,291,274 B1 | 3/2016 | Blume | |
| 9,322,243 B2 | 4/2016 | Baca | |
| 9,334,547 B2 | 5/2016 | Qiao | |
| 9,340,856 B2 | 5/2016 | Otobe | |
| 9,359,921 B2 | 6/2016 | Hashimoto | |
| 9,365,913 B2 | 6/2016 | Imaizumi | |
| 9,371,919 B2 | 6/2016 | Forrest | |
| 9,376,930 B2 | 6/2016 | Kim | |
| 9,377,019 B1 ‡ | 6/2016 | Blume | F04B 53/16 |
| 9,382,940 B2 | 7/2016 | Lee | |
| 9,435,454 B2 ‡ | 9/2016 | Blume | F16K 25/005 |
| 9,441,776 B2 | 9/2016 | Bryne | |
| 9,458,743 B2 | 10/2016 | Qiao | |
| 9,464,730 B2 | 10/2016 | Bihlet | |
| 9,506,382 B2 | 11/2016 | Yeager | |
| 9,528,508 B2 ‡ | 12/2016 | Thomeer | F04B 1/124 |
| 9,528,631 B2 ‡ | 12/2016 | McCarty | F16K 41/02 |
| 9,534,473 B2 | 1/2017 | Morris | |
| 9,534,691 B2 | 1/2017 | Miller | |
| 9,556,761 B2 | 1/2017 | Koyama | |
| 9,568,138 B2 | 2/2017 | Arizpe | |
| 9,605,767 B2 | 3/2017 | Chhabra | |
| 9,631,739 B2 | 4/2017 | Belshan | |
| D787,029 S | 5/2017 | Bayyouk | |
| 9,638,075 B2 | 5/2017 | Qiao | |
| 9,638,337 B2 | 5/2017 | Witkowski | |
| 9,650,882 B2 | 5/2017 | Zhang | |
| 9,651,067 B2 | 5/2017 | Beschorner | |
| 9,689,364 B2 | 6/2017 | Mack | |
| 9,695,812 B2 | 7/2017 | Dille | |
| 9,732,746 B2 | 8/2017 | Chandrasekaran | |
| 9,732,880 B2 | 8/2017 | Haines | |
| 9,745,968 B2 | 8/2017 | Kotapish | |
| 9,784,262 B2 | 10/2017 | Bayyouk | |
| 9,822,894 B2 ‡ | 11/2017 | Bayyouk | F16K 25/005 |
| 9,845,801 B1 | 12/2017 | Shek | |
| 9,857,807 B2 | 1/2018 | Baca | |
| 9,915,250 B2 | 3/2018 | Brasche | |
| 9,920,615 B2 | 3/2018 | Zhang | |
| 9,927,036 B2 ‡ | 3/2018 | Dille | F16K 1/42 |
| 9,945,362 B2 | 4/2018 | Skurdalsvold | |
| 9,945,375 B2 | 4/2018 | Zhang | |
| 9,989,044 B2 | 6/2018 | Bayyouk | |
| 10,029,540 B2 | 7/2018 | Seeger | |
| 10,082,137 B2 | 9/2018 | Graham | |
| 10,094,478 B2 | 10/2018 | Iijima | |
| 10,113,679 B2 | 10/2018 | Shuck | |

(56) References Cited

U.S. PATENT DOCUMENTS

| | | |
|---|---|---|
| 10,190,197 B2 | 1/2019 | Baker |
| 10,197,172 B2 | 2/2019 | Fuller |
| 10,215,172 B2 | 2/2019 | Wood |
| 10,221,848 B2 ‡ | 3/2019 | Bayyouk ............. F04B 53/1087 |
| 10,240,594 B2 | 3/2019 | Barnhouse, Jr. |
| 10,240,597 B2 * | 3/2019 | Bayyouk ................. F04B 53/16 |
| 10,247,182 B2 | 4/2019 | Zhang |
| 10,247,184 B2 | 4/2019 | Chunn |
| 10,273,954 B2 | 4/2019 | Brown |
| 10,288,178 B2 | 5/2019 | Nowell |
| 10,316,832 B2 | 6/2019 | Byrne |
| 10,330,097 B2 | 6/2019 | Skurdalsvold |
| 10,344,757 B1 ‡ | 7/2019 | Stark ......................... B22F 7/08 |
| 10,364,487 B2 | 7/2019 | Park |
| D856,498 S | 8/2019 | Bayyouk |
| 10,378,535 B2 | 8/2019 | Mahmood |
| 10,393,113 B2 | 8/2019 | Wagner |
| 10,400,764 B2 * | 9/2019 | Wagner ................. F04B 53/162 |
| 10,415,348 B2 | 9/2019 | Zhang |
| 10,428,406 B2 | 10/2019 | Yao |
| 10,428,949 B2 | 10/2019 | Miller |
| 10,443,456 B2 | 10/2019 | Hoeg |
| 10,465,680 B1 | 11/2019 | Guerra |
| 10,472,702 B2 | 11/2019 | Yeh |
| 10,487,528 B2 | 11/2019 | Pozybill |
| 10,519,070 B2 | 12/2019 | Sanders |
| 10,519,950 B2 | 12/2019 | Foster |
| 10,526,862 B2 | 1/2020 | Witkowski |
| 10,557,446 B2 | 2/2020 | Stecklein |
| 10,557,576 B2 | 2/2020 | Witkowski |
| 10,557,580 B2 | 2/2020 | Mendyk |
| 10,563,494 B2 | 2/2020 | Graham |
| 10,563,649 B2 | 2/2020 | Zhang |
| 10,570,491 B2 | 2/2020 | Hong |
| 10,576,538 B2 | 3/2020 | Kato |
| 10,577,580 B2 | 3/2020 | Abbas |
| 10,577,850 B2 | 3/2020 | Ozkan |
| 10,591,070 B2 | 3/2020 | Nowell |
| 10,605,374 B2 | 3/2020 | Takaki |
| 10,626,856 B2 | 4/2020 | Coldren |
| 10,633,925 B2 | 4/2020 | Panda |
| 10,634,260 B2 | 4/2020 | Said |
| 10,640,854 B2 | 5/2020 | Hu |
| 10,655,623 B2 * | 5/2020 | Blume ..................... F04B 1/145 |
| 10,663,071 B2 * | 5/2020 | Bayyouk ................. F04B 53/10 |
| 10,670,013 B2 | 6/2020 | Foster |
| 10,670,153 B2 | 6/2020 | Filipow |
| 10,670,176 B2 | 6/2020 | Byrne |
| 10,677,109 B2 | 6/2020 | Qiao |
| 10,677,240 B2 | 6/2020 | Graham |
| 10,677,365 B2 | 6/2020 | Said |
| 10,711,754 B2 | 7/2020 | Nelson |
| 10,711,778 B2 | 7/2020 | Buckley |
| 10,718,441 B2 | 7/2020 | Myers |
| 10,731,523 B2 | 8/2020 | Qu |
| 10,731,643 B2 | 8/2020 | DeLeon |
| 10,738,928 B2 | 8/2020 | Arizpe |
| 10,753,490 B2 | 8/2020 | Fuller |
| 10,753,495 B2 | 8/2020 | Bayyouk |
| 10,767,520 B1 | 9/2020 | Hattiangadi |
| 10,774,828 B1 | 9/2020 | Smith |
| 10,781,803 B2 | 9/2020 | Kumar |
| 10,787,725 B2 | 9/2020 | Fujieda |
| 10,801,627 B2 | 10/2020 | Warbey |
| 10,808,488 B2 | 10/2020 | Witkowski |
| 10,815,988 B2 | 10/2020 | Buckley |
| 10,830,360 B2 | 11/2020 | Frank |
| 10,851,775 B2 | 12/2020 | Stark |
| 10,865,325 B2 | 12/2020 | Nakao |
| 10,907,738 B2 | 2/2021 | Nowell |
| 10,914,171 B2 | 2/2021 | Foster |
| 10,934,899 B2 | 3/2021 | Hattiangadi |
| 10,941,866 B2 | 3/2021 | Nowell |
| 10,954,938 B2 | 3/2021 | Stark |
| 10,961,607 B2 | 3/2021 | Oshima |
| 10,962,001 B2 | 3/2021 | Nowell |
| D916,240 S | 4/2021 | Nowell |
| 10,968,717 B2 | 4/2021 | Tran |
| 10,988,834 B2 | 4/2021 | Lee |
| 10,989,321 B2 | 4/2021 | Hattiangadi |
| 11,028,662 B2 | 6/2021 | Rhodes |
| 11,041,570 B1 | 6/2021 | Buckley |
| 11,078,903 B2 | 8/2021 | Nowell |
| 11,104,981 B2 | 8/2021 | Chen |
| 11,105,185 B2 | 8/2021 | Spencer |
| 11,105,327 B2 | 8/2021 | Hurst |
| 11,105,328 B2 | 8/2021 | Bryne |
| 11,105,428 B2 | 8/2021 | Warbey |
| 11,111,915 B2 | 9/2021 | Bayyouk |
| 11,131,397 B2 | 9/2021 | Fan |
| D933,104 S | 10/2021 | Ellisor |
| D933,105 S | 10/2021 | Ellisor |
| D933,106 S | 10/2021 | Mullins |
| D933,107 S | 10/2021 | Mullins |
| 11,149,514 B2 | 10/2021 | Witkowski |
| 11,162,859 B2 | 11/2021 | Lei |
| 11,181,101 B2 | 11/2021 | Byrne |
| 11,181,108 B2 | 11/2021 | Brooks |
| 11,231,111 B2 | 1/2022 | Hurst |
| 11,242,849 B1 | 2/2022 | Smith |
| 2002/0084004 A1 | 7/2002 | Takahashi |
| 2002/0124961 A1 | 9/2002 | Porter |
| 2002/0159914 A1 | 10/2002 | Yeh |
| 2003/0205864 A1 ‡ | 11/2003 | Dietle ...................... F04B 47/00 277/43 |
| 2003/0233910 A1 | 12/2003 | Jeong |
| 2004/0170507 A1 ‡ | 9/2004 | Vicars ................... F04B 53/007 417/360 |
| 2004/0194576 A1 | 10/2004 | Ando |
| 2004/0234404 A1 ‡ | 11/2004 | Vicars ................... F04B 53/102 417/571 |
| 2004/0255410 A1 | 12/2004 | Schonewille |
| 2004/0258557 A1 | 12/2004 | Shun |
| 2005/0095156 A1 | 5/2005 | Wolters |
| 2005/0200081 A1 ‡ | 9/2005 | Stanton .................. F16J 15/183 277/51 |
| 2005/0226754 A1 ‡ | 10/2005 | Orr ........................ F04B 53/007 417/571 |
| 2006/0002806 A1 | 1/2006 | Baxter |
| 2006/0027779 A1 | 2/2006 | McGuire |
| 2006/0045782 A1 ‡ | 3/2006 | Kretzinger ............... F04B 53/16 417/55 |
| 2007/0086910 A1 | 4/2007 | Liang |
| 2007/0154342 A1 | 7/2007 | Tu |
| 2007/0273105 A1 | 11/2007 | Stanton |
| 2007/0295411 A1 | 12/2007 | Schwegman |
| 2008/0031769 A1 | 2/2008 | Yeh |
| 2008/0092384 A1 | 4/2008 | Schaake |
| 2008/0279706 A1 ‡ | 11/2008 | Gambier ............. F04B 53/1025 417/45 |
| 2009/0041611 A1 | 2/2009 | Sathian |
| 2009/0261575 A1 ‡ | 10/2009 | Bull ..................... F16L 27/1275 285/32 |
| 2009/0278069 A1 ‡ | 11/2009 | Blanco .................. F16K 15/063 251/309 |
| 2010/0272597 A1 | 12/2010 | Qiao |
| 2011/0079302 A1 ‡ | 4/2011 | Hawes ................... F04B 53/102 137/538 |
| 2011/0142701 A1 | 6/2011 | Small |
| 2011/0189040 A1 | 8/2011 | Vicars |
| 2011/0255993 A1 ‡ | 10/2011 | Ochoa ................... F04B 53/162 417/53 |
| 2012/0141308 A1 | 6/2012 | Saini |
| 2012/0163969 A1 | 6/2012 | Ongole |
| 2012/0304821 A1 | 12/2012 | Ando |
| 2013/0020521 A1 ‡ | 1/2013 | Byrne ..................... F16K 1/385 251/334 |
| 2013/0202457 A1 | 8/2013 | Bayyouk |
| 2013/0202458 A1 ‡ | 8/2013 | Byrne ...................... F04B 7/02 417/279 |
| 2013/0319220 A1 | 12/2013 | Luharuka |
| 2014/0083541 A1 | 3/2014 | Chandrasekaran |
| 2014/0083547 A1 | 3/2014 | Hwang |

(56) References Cited

U.S. PATENT DOCUMENTS

| | | |
|---|---|---|
| 2014/0196883 A1 | 7/2014 | Artherholt |
| 2014/0260954 A1 | 9/2014 | Young |
| 2014/0286805 A1 ‡ | 9/2014 | Dyer .................... F04B 49/22 417/57 |
| 2014/0322034 A1 | 10/2014 | Bayyouk |
| 2014/0348677 A1 | 11/2014 | Moeller |
| 2015/0132157 A1 | 5/2015 | Whaley |
| 2015/0144826 A1 ‡ | 5/2015 | Bayyouk .............. F16K 25/005 251/359 |
| 2015/0147194 A1 ‡ | 5/2015 | Foote .................... F04B 53/16 417/53 |
| 2015/0219096 A1 ‡ | 8/2015 | Jain ...................... F04B 53/162 417/44 |
| 2015/0300332 A1 ‡ | 10/2015 | Kotapish .................. F04B 1/12 417/53 |
| 2015/0368775 A1 | 12/2015 | Baker |
| 2016/0201169 A1 | 7/2016 | Vecchio |
| 2016/0215588 A1 | 7/2016 | Belshan |
| 2016/0238156 A1 ‡ | 8/2016 | Hubenschmidt .... F16K 37/0008 |
| 2016/0245280 A1 | 8/2016 | Todorov |
| 2016/0319626 A1 | 11/2016 | Dille |
| 2016/0319805 A1 | 11/2016 | Dille |
| 2017/0067459 A1 ‡ | 3/2017 | Bayyouk .................. B23P 6/00 |
| 2017/0089473 A1 ‡ | 3/2017 | Nowell .................. F16K 5/0485 |
| 2017/0097107 A1 ‡ | 4/2017 | Hotz ...................... F16K 41/02 |
| 2017/0159655 A1 | 6/2017 | Morreale |
| 2017/0218951 A1 | 8/2017 | Graham |
| 2017/0218993 A1 | 8/2017 | Freed |
| 2017/0297149 A1 | 10/2017 | Shinohara |
| 2017/0298932 A1 ‡ | 10/2017 | Wagner .................. F04B 53/22 |
| 2017/0314097 A1 | 11/2017 | Hong |
| 2017/0342776 A1 | 11/2017 | Bullock |
| 2017/0342976 A1 | 11/2017 | Reddy |
| 2018/0017173 A1 | 1/2018 | Nowell |
| 2018/0058431 A1 | 3/2018 | Blume |
| 2018/0202434 A1 | 7/2018 | Barnhouse, Jr. |
| 2018/0298894 A1 | 10/2018 | Wagner |
| 2018/0312946 A1 | 11/2018 | Gigliotti, Jr |
| 2018/0320258 A1 | 11/2018 | Stewart |
| 2018/0340245 A1 | 11/2018 | Kernion |
| 2018/0354081 A1 | 12/2018 | Kalyani |
| 2019/0011051 A1 | 1/2019 | Yeung |
| 2019/0017503 A1 ‡ | 1/2019 | Foster .................... F04B 53/16 |
| 2019/0024198 A1 | 1/2019 | Hong |
| 2019/0024225 A1 | 1/2019 | Tang |
| 2019/0032685 A1 | 1/2019 | Foster |
| 2019/0032720 A1 | 1/2019 | Bayyouk |
| 2019/0047049 A1 | 2/2019 | Fujieda |
| 2019/0049052 A1 | 2/2019 | Shuck |
| 2019/0063427 A1 | 2/2019 | Nowell |
| 2019/0071755 A1 | 3/2019 | Lee |
| 2019/0072088 A1 | 3/2019 | DeLeon |
| 2019/0072089 A1 | 3/2019 | Buckley |
| 2019/0085806 A1 | 3/2019 | Meibgeier |
| 2019/0085978 A1 | 3/2019 | Chase |
| 2019/0101109 A1 | 4/2019 | Cortes |
| 2019/0107226 A1 | 4/2019 | Bayyouk |
| 2019/0120389 A1 | 4/2019 | Foster |
| 2019/0136842 A1 | 5/2019 | Nowell |
| 2019/0145400 A1 | 5/2019 | Graham |
| 2019/0145568 A1 ‡ | 5/2019 | Nick ...................... E21B 33/038 138/96 R |
| 2019/0154033 A1 | 5/2019 | Brooks |
| 2019/0170137 A1 | 6/2019 | Chase |
| 2019/0170138 A1 | 6/2019 | Bayyouk |
| 2019/0194786 A1 | 6/2019 | Chuang |
| 2019/0226058 A1 | 7/2019 | Fujieda |
| 2019/0063430 A1 | 8/2019 | Byrne |
| 2019/0242373 A1 | 8/2019 | Wernig |
| 2019/0264683 A1 | 8/2019 | Smith |
| 2019/0292633 A1 | 9/2019 | Porret |
| 2019/0301314 A1 | 10/2019 | Kamo |
| 2019/0301447 A1 | 10/2019 | Skurdalsvold |
| 2019/0316685 A1 ‡ | 10/2019 | Wang .................... F16K 15/063 |
| 2019/0376508 A1 | 12/2019 | Wagner |
| 2020/0056272 A1 | 2/2020 | Hong |
| 2020/0063899 A1 | 2/2020 | Witkowkski |
| 2020/0080660 A1 | 3/2020 | Dyer |
| 2020/0080661 A1 | 3/2020 | Mullins |
| 2020/0157663 A1 | 5/2020 | Yang |
| 2020/0158123 A1 | 5/2020 | Chen |
| 2020/0173317 A1 | 6/2020 | Keating |
| 2020/0191286 A1 * | 6/2020 | Iannetti .................... F04B 53/10 |
| 2020/0208776 A1 | 7/2020 | Bayyouk |
| 2020/0217424 A1 | 7/2020 | Rasmussen |
| 2020/0240531 A1 | 7/2020 | Nowell |
| 2020/0256149 A1 | 8/2020 | Witkowski |
| 2020/0284253 A1 | 9/2020 | Foster |
| 2020/0284365 A1 | 9/2020 | Bayyouk |
| 2020/0290118 A1 | 9/2020 | Chen |
| 2020/0291731 A1 | 9/2020 | Haiderer |
| 2020/0300240 A1 | 9/2020 | Nowell |
| 2020/0308683 A1 | 10/2020 | Xue |
| 2020/0347843 A1 | 11/2020 | Mullins |
| 2020/0355182 A1 | 11/2020 | DeLeon |
| 2020/0392613 A1 | 12/2020 | Won |
| 2020/0393054 A1 | 12/2020 | Fuller |
| 2020/0399979 A1 | 12/2020 | Webster |
| 2020/0400003 A1 | 12/2020 | Webster |
| 2020/0400130 A1 | 12/2020 | Poehls |
| 2020/0400132 A1 | 12/2020 | Kumar |
| 2020/0400140 A1 | 12/2020 | Bayyouk |
| 2020/0400242 A1 | 12/2020 | Spencer |
| 2021/0010113 A1 | 1/2021 | Qiao |
| 2021/0010470 A1 | 1/2021 | Blume |
| 2021/0017830 A1 | 1/2021 | Witkowski |
| 2021/0017982 A1 | 1/2021 | Bayyouk |
| 2021/0017983 A1 | 1/2021 | Myers |
| 2021/0040836 A1 | 2/2021 | Baskin |
| 2021/0054486 A1 | 2/2021 | Kim |
| 2021/0102630 A1 | 4/2021 | Nowell |
| 2021/0130936 A1 | 5/2021 | Wu |
| 2021/0148471 A1 | 5/2021 | Murugesan |
| 2021/0180156 A1 | 6/2021 | Kim |
| 2021/0190053 A1 | 6/2021 | Wagner |
| 2021/0190223 A1 | 6/2021 | Bayyouk |
| 2021/0197524 A1 | 7/2021 | Maroli |
| 2021/0215071 A1 | 7/2021 | Oikawa |
| 2021/0215154 A1 | 7/2021 | Nowell |
| 2021/0230987 A1 | 7/2021 | Tanner |
| 2021/0239111 A1 | 8/2021 | Zitting |
| 2021/0246537 A1 | 8/2021 | Maroli |
| 2021/0260704 A1 | 8/2021 | Hu |
| 2021/0270261 A1 | 9/2021 | Zhang |
| 2021/0285551 A1 | 9/2021 | Renollett |
| 2021/0310484 A1 | 10/2021 | Myers |
| 2021/0381504 A1 | 12/2021 | Wagner |
| 2021/0381615 A1 | 12/2021 | Riedel |
| 2021/0388832 A1 | 12/2021 | Byrne |

FOREIGN PATENT DOCUMENTS

| | | |
|---|---|---|
| CN | 102748483 | ‡ 10/2012 |
| CN | 102410194 | 4/2021 |
| EP | 0 414 955 | 3/1991 |
| EP | 0414955 | ‡ 3/1991 |

OTHER PUBLICATIONS

White Star Pump Co., "Maintenance Manual: Triplex Pump WS-1300/1600," 2005, http://www.whitestarpump.com/ES/docs/user_t.pdf, 45 pages.‡

Flowserve, "Dynamic Balance Plug Valve and Double DB Plug Valve: Installation, Operation and Maintenance," 2011, https://www.flowserve.com/sites/default/files/2016-07/NVENIM2005-00_0.pdf, 36 pages.‡

U.S. Appl. No. 16/814,267, 194 pages.
U.S. Appl. No. 17/120,121, 110 pages.
U.S. Appl. No. 62/234,483, 45 pages.
U.S. Appl. No. 62/315,343, 41 pages.
U.S. Appl. No. 62/318,542, 44 pages.

(56) References Cited

OTHER PUBLICATIONS

U.S. Appl. No. 62/346,915, 41 pages.
U.S. Appl. No. 62/379,462, 24 pages.
"Flush Free Sealing Benefits," Oct. 3, 2011, http://empoweringpumps.com/flush-free-sealing-benefits/, accessed May 9, 2020, 5 pages.
Gardner Denver, Well Servicing Pump Model GD-3000—Operating and Service Manual, Apr. 2011, 44 pages.
Gardner Denver, Well Servicing Pump Model GD-1000Q—Fluid End Parts List, Sep. 2011, 24 pages.
Gardner Denver, Well Servicing Pump Model HD-2250—Operating and Service Manual, Jan. 2005, 44 pages.
Gardner Denver, GD 2500Q HDF Frac & Well Service Pump, 2 pages.
Gutting Tool Engineering, "Groove milling," Aug. 1, 2012, https://www.ctemag.cojm/news/articles/groove-milling, accessed May 13, 2020, 11 pages.
Vargususa, "Groovex Innovative Grooving Solutions—Groove Milling," Dec. 12, 2011, http://www.youtube.com/watch?v=vrFxHJUXjvk, 68 pages.
Kerr Pumps, Kerr KA-3500B/KA-3500BCB Plunger Pump Parts and Service Manual, 41 pages.
Kerr Pumps, Kerr KD-1250B/KD-1250BCB Plunger Pump Service Manual, 38 pages.
Kerr Pumps, Kerr KJ-2250B and KJ-2250BCB Plunger Pump Service Manual, 38 pages.
Kerr Pumps, Kerr KM-3250B / KM-3250BCB Plunger Pump Service Manual, 35 pages.
Kerr Pumps, Kerr KP-3300B / KP-3300BCB Plunger Pump Service Manual, 41 pages.
Kerr Pumps, Kerr KT-3350B/BCB KT-3400BCB Plunger Pump Service Manual, 46 pages.
Kerr Pumps, Kerr triplex pump km3250bcb 10,000 psi @ 5.1 gmp, Feb. 2, 2021, http://imged.com/kerr-triplex-pump-km3250bcb-10-000-psi-5-1-gmp-8234739.html, 2 pages.
Lex Machina, 77 Federal district court cases for Alan D Albright of W.D. Tex., http://law.lexmachina.com/court/txwd/judge/5198506/cases?status=open&filed_on-from=2020-02-19&filed_on-to=2020-04-19&pending-, 7 pages.
Lex Machina, Motion Metrics Report for 834 orders issued by District Judge Alan D Albright (ADA) in 1,603 cases from the Search for federal district court cases before Judge Alan D Albright, https://law.lexmachina.com/motions/motion_metrics?cases_key=yyix9Y8-k2k, generated on Sep. 23, 2020, 1 page.
Lex Machina, 6:20-cv-00200-ADA, *Kerr Machine Co. v. Vulcan Industrial Holdings, LLC* Docket Entries, https://law.lexmachina.com/cases/2004206451#docket-entries, 6 pages.
Jonathan Maes, "Machining Square Inside Corners: Conquer the Nightmare!," accessed Sep. 8, 2020, https://makeitfrommetal.com/machining-square-inside-corners-the-night . . . , 22 pages.
Ross Mackay, "Process Engineering: Properly seal that pump," May 17, 2005, https://www.chemicalprocessing.com/articles/2005/465, 11 pages.
MSI Fluid End Components, https://www.scribd.com/document/421304589/Fluid-End, 1 page.
MSI Dixie Iron Works, Ltd., MSI QI-1000 Technical Manual for 1000 HP Quintuplex MSI QI-1000 Pump, Feb. 21, 2004, 90 pages.
MSI, Product Listing and Pricing, accessed Mar. 8, 2016, 19 pages.
National Oilwell Varco, 267Q-6M Quinuplex Plunger Pump: Parts List, Jul. 21, 2008, 13 pages.
Oil and Gas Well Servicing, Audit Procedures for Oil and Gas Well Servicing, May 2010, Texas Comptroller of Public Accounts, Audit Division, 68 pages.
Tony Atkins and Marcel Escudier, Oxford Dictionary of Mechanical Engineering, Oxford University Press, 2013, 10 pages.
Parker Hannifin Corporation and Autoclave Engineers, Technical Information, 2016, 16 pages.
Girdhar, Moniz and Mackay, "Chapter 5.4 Centrifugal pump design," Plant and Process Engineering 360, 2010, pp. 519-536.
Parker Hannifin Corporation, PolyPak Seals for Hydraulic Applications Catalog EPS 5370_PolyPak, 2015, 38 pages.
Paresh Girdhar and Octo Moniz, "Practical Centrifugal Pumps—Design. Operation and Maintenance," Newnes, 2005, 33 pages.
Reinhard Preiss, "Stress concentration factors of flat end to cylindrical shell connection with a fillet or stress relief groove subjected to internal pressure," 1997, Int. J. Pres. Ves. & Piping, vol. 73, pp. 183-190.
Caterpillar, WS255 Quintuplex Well Stimulation Pump, 2 pages.
Gardner Denver Pumps, Redline Series Brochure, 3 pages.
Eaton Aerospace Group, Resilient Metallic Seals, TF100-35D, Oct. 2013, 60 pages.
Scott McKeown, "District Court Trial Dates Tend to Slip After PTAB Discretionary Denials—Patents Post-Grant," Jul. 24, 2020, Ropes & Gray, accessed Sep. 23, 2020, 3 pages.
Ricky Smith and R. Keith Mobley, "Rules of Thumb for Maintenance and Reliability Engineers—Chapter 14: Packing and Seals," Elsevier, 2008, pp. 239-250.
Schlumberger, Jet Manual 02—Reciprocating Pumps, Aug. 7, 2015, 63 pages.
Schlumberger, Treating Equipment Manual: Fluid Ends, Section 10, Apr. 2000, 87 pages.
SPM Oil & Gas, SPM QEM 3000 Frac Pump, 2021, 4 pages.
Supplemental Declaration of Steven M. Tipton, Ph.D., P.E.—Case PGR2020-00065, U.S. Pat. No. 10,591,070, Mar. 2, 2021, 35 pages.
Servagroup, TPD 600 Triplex Pump Brochure, Mar. 24, 2011, 2 pages.
Utex Industries, Inc., Well Service Products Catalog, Jun. 2017, 51 pages.
Utex Industries, Inc., Well Service Packing—Packing Assemblies Complete & Replacement, May 2013, 40 pages.
Vargus Ltd., Groove Milling High Precision Tools for Groove Milling, Dec. 2012, pp. 2-22.
U.S. Appl. No. 16/722,139, 104 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Docket Entry, Aug. 2, 2020, 1 page.
*Acquanlan Deonshay Harris v. Cenlar, FSB*, Case No. 6:20-CV-00271-ADA-JCM, Document 13, Scheduling Order, Aug. 20, 2020, 4 pages.
*Kerr Machine Co. vs. Vulcan Industrial Holdings, LLC*, Case No. WA:20-CV-00200-ADA, Order Setting Markman Hearing, May 29, 2020, 1 page.
*Kendra Coufal v. Roger Lee Thomas and Apple Logistics, Inc.*, Case No. 6:20-CV-00356-ADA-JCM, Document 12, Scheduling Order, Jul. 28, 2020, 4 pages.
*Tipton International, Inc., v. Vetbizcorp, LLC and Samuel Cody*, Case No. 6:20-CV-00554-ADA-JCM, Document 8, Scheduling Order, Aug. 20, 2020, 4 pages.
Declaration of Duncan Hall from Internet Archive/Wayback Machine, Feb. 3, 2021, Kerr Plunger Pump Manuals, 20 pages.
Michael Agnes, Editor, Webster's New World College Dictionary, Fourth Edition, 1999, 5 pages.
WEIR SPM Oil & Gas, Grooveless Fluid End, 2008, 1 page.
WEIR SPM Oil & Gas, Weir SPM General Catalog, 2009, 40 pages.
WEIR SPM Oil & Gas, Well Service Pump Reference Guide, 2008, 55 pages.
*Intellectual Ventures I LLC v VMWare, Inc.*, Case No. 1:19-CV-01075-ADA, Document 91 (W.D. Tex Jun. 3, 2020), Defendant VMWare, Inc.'s Stipulation of Invalidity Contentions for U.S. Pat. No. 7,949,752, Jun. 3, 2020, 5 pages.
*Vulcan Industrial Holding, LLC et al. v. Kerr Machine Co.* Case No. 4:21-cv-433, Document 1, Complaint for Declaratory Judgment of Patent Non-Infringement, Feb. 9, 2021, 17 pages.
*Trilogy Enterprises, Inc., v. Trilogy Education Services, LLC*, Case. No. 6:19-cv-199-ADA-JCM, Document 35, Fifth Amended Scheduling Order, Sep. 8, 2020, 4 pages.
*Dr. Corneliu Bolbocean v Baylor University*, Case No. 6:19-CV-00465-ADA-JCM, Document 34, Scheduling Order, Apr. 6, 2020, 4 pages.
*Kerr Machine Co., v Vulcan Energy Services, LLC, Vulcan Industrial Holdings, LLC, and Cizion, LLC d/b/a/ Vulcan Industrial*

(56) References Cited

OTHER PUBLICATIONS

*Manufacturing*, Case No. 6:21-CV-00044-ADA, Document 4, Plaintiffs Amended Complaint for Patent nfringement and Jury Demand, Jan. 19, 2021, 30 pages.
*Kerr Machine Co.*, v *Vulcan Energy Services, LLC, Vulcan Industrial Holdings, LLC, and Cizion, LLC d/b/a/ Vulcan Industrial Manufacturing*, Case No. 6:21-CV-00044, Document 1, Plaintiffs Original Complaint for Patent Infringement and Jury Demand, Jan. 19, 2021, 47 pages.
*Kerr Machine Co.*, v *Vulcan Energy Services, LLC, Vulcan Industrial Holdings, LLC, and Cizion, LLC d/b/a/ Vulcan Industrial Manufacturing*, Case No. 6:21-CV-00044-ADA, Document 10, Plaintiffs Second Amended Complaint for Patent Infringement and Jury Demand, Feb. 1, 2021, 88 pages.
*Kerr Machine Co.*, v *Vulcan Industrial Holdings, LLC, Vulcan Energy Services, LLC, Cizion, LLC*, Case No. W-20-CV-00200-ADA-24, Order Setting Trial Date, Jun. 14, 2020, 1 page.
*Kerr Machine Co.*, v. *Vulcan Industrial Holdings, LLC*, Case. No. 6:20-CV-00200-ADA, Affidavit of Service, Apr. 7, 2020, 1 page.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Plaintiffs First Amended Complaint for Patent Infringement and Jury Demand, Jun. 4, 2020, 11 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 26, Defendant Cizion, LLC d/b/a Vulcan Industrial Manufacturing, LLC's Motion to Dismiss or Transfer, Jul. 22, 2020, 10 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Opposed Motion to Stay Litigation Pending the Outcome of the Pending Post-Grant Review Proceeding Before the Patent Trial and Appeal Board, Jul. 31, 2020, 14 pages.
*Kerr Machine Co.*, v *Vulcan Industrial Holdings, LLC*, Case No. 6:20-CV-00200-ADA, Plaintiffs Preliminary Infringement Contentions, May 22, 2020, 50 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Preliminary Invalidity Contentions, Aug. 13, 2020, 29 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 34, Scheduling Order, Aug. 11, 2020, 3 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 38, Plaintiffs Second Amended Complaint for Patent Infringement and Jury Demand, Sep. 25, 2020, 11 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 5, Standing Order regarding Scheduled Hearings in Civil Cases in Light of Chief Judge Garcia's 24 Amended Order, Mar. 24, 2020, 4 pages.
*Kerr Machine Co.*, v *Vulcan Industrial Holdings, LLC, Vulcan Energy Services, LLC, and Cizion, LLC d/b/a/ Vulcan Industrial Manufacturing*, Civil Docket for Case No. 6:20-cv-00200-ADA, accessed Sep. 11, 2020, 7 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 54, Claim Construction Order, Dec. 3, 2020, 3 pages.
*Kerr Machine Co.*, v *Vulcan Industrial Holdings, LLC*, Case No. 6:20-CV-00200, Document 1, Plaintiff's Original Complaint for Patent Infringement and Jury Demand, Mar. 19, 2020, 39 pages.
*Adriana del Rocio Barberena-Rovira, et al.*, v *Kuiper Dairy, LLC, et al.*, Case No. 6:20-CV-00250-ADA-JCM, Document 20, Scheduling Order, Jul. 22, 2020, 4 pages.
*Senior Living Properties, LLC c. Ironshore Speciality, Insurance Company*, Case No. 6:20-CV-00282-ADA-JCM, Document 12, Scheduling Order, Jul. 7, 2020, 4 pages.
*Dionne Bracken, Individually and as Next Friend of A.M.B.*, v *Michael D. Ashcraft and Envirovac Waste Transport Systems, Inc.*, Case No. 6:20-CV-00308-ADA-JCM, Document 17, Scheduling Order, Jul. 28, 2020, 4 pages.
*Dynaenergetics GmbH & Co. KG and Dynaenergetics US, Inc.*, v. *Hunting Titan, Ltd.; Hunting Titan, Inc.; and Hunting Energy Services, Inc.*, Case No. H-17-3784, Order, Sep. 4, 2020, 2 pages.
Slip Opinion, In re Sand Revolution LLC, Case No. 2020-00145 (Fed. Cir. Sep. 28,2020), 3 pages.
In re Vulcan Industrial Holdings, LLC, Case No. 2020-00151 (Fed. Cir. Sep. 29, 2020), Petition for Writ of Mandamus, 43 pages.
*Densys Ltd.*, v. *3Shape Trios A/S and 3Shape A/S*, Case No. WA:19-CV-00680-ADA, Document 27, Scheduling Order, Apr. 8, 2020, 4 pages.
KerrPumps, "Super Stainless Steel Better Than The Best," http://kerrpumps.com/superstainless?gclid=EAIaIQobChMlg47o482q6wlVilTICh2XPA-qEAAYASAAEgKrxPD_BwE, 2013, last accessed: Aug. 21, 2020, 6 pages.
Kerrpumps, "Frac One Pumps—Fluid End—Fracing," http://kerrpumps.com/fracone, 2013, last accessed: Aug. 21, 2020, 3 pages.
Kerrpumps, "KerrPumps—Frac Pump & Mud Pump Fluid End—Fluid End Pump," http://kerrpumps.com/fluidends, 2013, last accessed: Aug. 21, 2020, 6 pages.
Vulcan Industrial, "Vulcan," http://www.vulcanindustrial.com/, 2019, last accessed: Aug. 21, 2020, 3 pages.
Vulcan Industrial, "Vulcan," http://www.vulcanindustrial.com/fluid-ends/, 2019, last accessed: Aug. 21, 2020, 3 pages.
Covert Manufacturing, Inc., "Fluid End Block: Covert Manufacturing", (site visited Jul. 30, 2021), coveilmfg.com, URL: <http://www.covertmfg.com/our-capabilities/fluid-end-block/> (Year: 2021).
Kerr Pumps, "the most advanced fluid ends", (site visited Aug. 5, 2021), Kerrpumps.com, URL: <http://kerrpumps.com/fluidends> (Year: 2021).
Shandong Baorun, 2250 Triplex Plunger Pump Fluid End Exchangeable with Spm, (site visited Aug. 5, 2021), made-in-china.com, URL: <https://sdbaorun.en.made-in-china.com/product/wNixIDXYrshL/China-2250-Triplex-Plunger-Pump-Fluid-End-Exchangeable-with-Spm.html> (Year: 2021).
John Miller, "The Reciprocating Pump, Theory, Design and Use," 1995, 2nd Edition, Krieger Publishing Company, Malabar, Florida, 1 page.
"QIH-1000 HP Quintuplex," Dixie Iron Works, 2017, https://web.archive.org/web/20171031221150/http:/www.diwmsi.com/pumping/qi-1000/.
Technical Manual MSI Hybrid Well Service Pump Triplex and Quintuplex Models, Dixie Iron Works, Mar. 12, 2019, 88 pages.
Carpenter, "CarTech Ferrium C61 Data Sheet," 2015, 2 pages.
The American Heritage Dictionary, Second College Edition, 1982, 6 pages.
Matthew Bultman, "Judge in West Texas Patent Hot Spot Issues Revised Guidelines," Sep. 23, 2020, Bloomberg Law News, 3 pages.
David L. Taylor, "Machine Trades Blueprint Reading: Second Edition," 2005, 3 pages.
Blume, U.S. Pat. No. 6,544,012, issued Apr. 8, 2003, Fig. 12A.
Caterpillar, "Cat Fluid Ends For Well Stimulation Pumps," 2015, 2 pages.
Claim Chart for U.S. Pat. No. 6,544,012, 23 pages.
Claim Chart for U.S. Pat. No. 7,186,097, 22 pages.
Claim Chart for U.S. Pat. No. 7,845,413, 8 pages.
Claim Chart for U.S. Pat. No. 9,534,472, 8 pages.
Claim Chart for U.S. Pat. Pub. No. 2013/0319220, 17 pages.
Claim Chart for U.S. Pat. Pub. No. 2014/0348677, 10 pages.
Claim Chart for U.S. Pat. Pub. No. 2015/0132157,23 pages.
Claim Chart for "GD-3000," 9 pages.
Claim Chart for "NOV-267Q," 14 pages.
Collins English Dictionary, "annular," https://www.collinsdictionary.com/us/dictionary/english/annular, 2021, 4 pages.

(56) References Cited

OTHER PUBLICATIONS

Collins English Dictionary, "circumference," https://www.collinsdictionary.com/us/dictionary/english/circumference, 2021, 7 pages.
Collins English Dictionary, "plug," https://www.collinsdictionary.com/us/dictionary/english/plug, 2021, 17 pages.
Collins English Dictionary, "profile," https://www.collinsdictionary.com/us/dictionary/english/profile, 2021, 10 pages.
Collins English Dictionary, "sleeve," "therethrough," "through," "tube," and "tubular," 8 pages.
Collins English Dictionary, "space," https://www.collinsdictionary.com/us/dictionary/english/space, 2021, 13 pages.
Collins English Dictionary, "stairstep," https://www.collinsdictionary.com/us/dictionary/english/stairstep, 2021, 3 pages.
Congressional Record—Extensions of Remarks, Apr. 18, 2007, pp. E773-E775.
Congressional Record, Mar. 7, 2011, 31 pages.
"Declaration of Steven M. Tipton, Ph.D., P.E., Submitted with Patent Owner's Preliminary Response," Sep. 11, 2020, 155 pages.
"Declaration of William D. Marscher, P.E.—U.S. Pat. No. 10,914,171," Feb. 11, 2021, 308 pages.
"Declaration of William D. Marscher, P.E.—U.S. Pat. No. 10,591,070," May 25, 2020, 209 pages.
Email dated Sep. 22, 2020 in PGR2020-00065, 3 pages.
Email dated Sep. 25, 2020 in *Kerr Machine* v *Vulcan Industrial Holdings*, 1 page.
U.S. Pat. No. 10,288,178, 353 pages.
U.S. Pat. No. 10,519,950, 142 pages.
U.S. Pat. No. 10,591,070, 168 pages.
U.S. Appl. No. 13/773,271, 250 pages.
U.S. Appl. No. 15/719,124, 183 pages.

\* cited by examiner
‡ imported from a related application

US 11,353,117 B1

VALVE SEAT INSERT SYSTEM AND METHOD

CROSS REFERENCE TO RELATED APPLICATIONS

This application is a continuation-in-part of co-pending U.S. patent application Ser. No. 16/746,519 filed Jan. 17, 2020 titled "COMPOSITE VALVE SEAT SYSTEM AND METHOD," the full disclosure of which is hereby incorporated herein by reference in its entirety for all purposes.

TECHNICAL FIELD

Embodiments of the subject matter disclosed herein generally relate to pump systems, and in particular to valve seats in pump systems.

BACKGROUND

Pumping systems may be used in a variety of applications, especially industrial applications where pumping systems are used to elevate a working fluid pressure. One such application is hydraulic fracturing systems, where high pressure pumps are used to increase a fluid pressure of a working fluid (e.g., fracturing fluid, slurry, etc.) for injection into an underground formation. The working fluid may include particulates, which are injected into fissures of the formation. When the fluid is removed from the formation, the particulates remain and "prop" open the fissures, facilitating flow of oil and gas. In many applications, reciprocating pumps are used where a fluid is introduced into a fluid end inlet passage and out through an outlet passage. A valve assembly reciprocates within the pump and contacts valve seats at the inlet and outlet passages. Due to the particulates and corrosive nature of the working fluid, the valve seats may become eroded or otherwise damaged, which my prevent sealing of the inlet and outlet passages.

SUMMARY

Applicants recognized the problems noted above herein and conceived and developed embodiments of systems and methods, according to the present disclosure, for valve seats in pump systems.

In accordance with one or more embodiments, a valve assembly for a fracturing pump includes a valve seat having a bore, the valve seat having an upper region forming at least a portion of a strike face. The valve assembly also includes a groove formed in the upper region of the valve seat and a valve seat insert positioned within the bore. The valve seat insert includes a body portion extending at least a portion of a bore length. The valve seat insert also includes an insert bore extending through the body portion. The valve seat insert further includes an upper insert region, at least a portion of the upper insert region positioned within the groove, the upper insert region forming at least a portion of the strike face. The valve assembly also includes a valve member positioned to reciprocate within the bore, the valve member moving between an open position and a closed position, wherein at least a portion of the valve member engages at least a portion of the strike face in the closed position.

In accordance with another embodiment, a valve seat for use in a fracturing pump includes a first body, including a tapered portion extending toward a first bore, the first bore extending through the first body, and a groove formed in the first body. The valve seat also includes a second body positioned at least partially within the groove, the second body including a slanted face that substantially conforms to the tapered portion. The valve seat further includes a third body, arranged within the first bore, the third body extending along at least a portion of a first bore length, the third body having a second bore coaxial with the first bore, and a second bore diameter that is less than a first bore diameter.

In accordance with another embodiment, a valve seat for use in a fracturing pump includes a first body and a second body. The first body includes an upper region having a slanted face and first outer diameter. The first body also includes a lower region having a second outer diameter, the second outer diameter being less than the first outer diameter. The first body further includes a bore extending through the first body. The first body includes a groove formed in the upper region, the groove extending to the bore. The second body includes an upper insert region, at least a portion of the upper insert region arranged within the groove. The second body also includes a lower insert region, the lower insert region extending along at least a portion of the lower region, the lower insert region having a lower insert diameter less than a bore diameter. The second body further includes a channel formed in the lower insert region, the channel extending along at least a portion of the lower insert region and having a channel diameter less than the bore diameter and greater than the lower insert diameter.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

Figure 1:
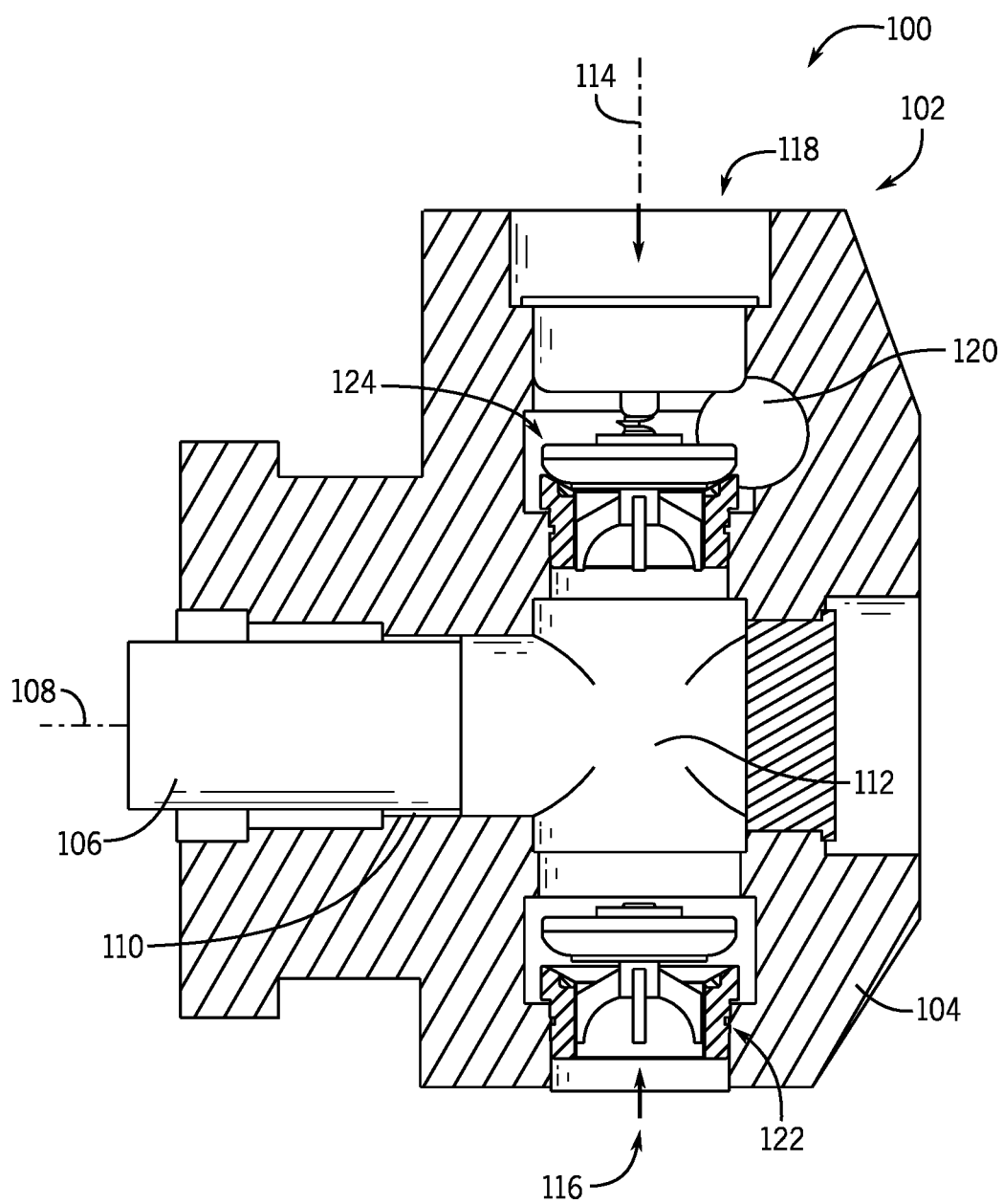
FIG. 1 is a schematic cross-sectional view of an embodiment of a pump assembly, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure are directed toward a valve assembly that includes a valve seat having one or more inserts to reduce a likelihood of damage to the valve seat, which may decrease operational time for a pumping assembly. In various embodiments, an insert is installed within a bore of the valve seat to provide a barrier between a reciprocating valve member and at least a portion of the bore. In certain embodiments, the insert is formed from a harder or stronger material than the remainder of the valve seat, and as a result, intervals of time between valve seat replacement and/or repair may be increased. In various embodiments, the inserts may include channels to guide movement of the valve member and/or to facilitate flow within the bore. For example, the channels may be linear channels that align with the movement of the valve member and/or non-linear channels that do not interact with the valve member, but direct fluid within the bore. The insert may be integrally formed with the valve seat or may be mechanically coupled to the valve seat.

Embodiments of the present disclosure are directed toward a valve seat that includes an insert or liner portion that is grooved for altering a flow path in addition to providing a hardened and/or wear resistance guiding surface for the valve and general flow path. The grooves formed in the liner portion may serve multiple purposes, including at least controlling or modifying fluid flow through a seat area and/or orientating a valve member. The insert may be replaceable, thereby eliminating configurations where entire valve seats are discarded when damaged.

In various embodiments, a valve seat assembly for a fracturing pump includes a valve seat body and a valve seat insert. The valve seat body includes a bore extending therethrough, with the valve seat insert including a strike face at a top region of the valve seat assembly opposite a bottom region of the valve seat assembly. In embodiments, at least a portion of the strike face is formed by the valve seat insert positioned within a portion of the valve seat body. The valve seat insert, at least a portion of which is arranged within the bore, extends such that at least a portion of an axial length of the valve seat insert forms a barrier between the valve seat body and the bore. In embodiments, a valve member is positioned to reciprocate within the bore, the valve member moving between an open position and a closed position, wherein at least a portion of the valve member engages at least a portion of the strike face in the closed position. In various embodiments, the valve seat insert includes a guide channel extending longitudinally at an angle along at least a portion of the axial length of the valve seat body, the guide channel including a recessed portion that alters the flow characteristics within the bore. Additionally, in embodiments, the valve seat insert is a single and replaceable piece that is formed from a ceramic material, a wear resistant steel, a polymer, or a combination thereof. In certain embodiments, the insert is formed from a different material than the valve seat.

In embodiments, the guide channel extends an angle of 0 degrees from the axial direction such that the guide channel serves as a guide extending longitudinally along at least a portion of the axial length, the guide including a recessed portion that receives at least a portion of a guide leg of the valve member. In certain embodiments, the guide channel extends at an angle between 1 and 89 degrees from axial direction longitudinally along at least a portion of the axial length and the guide channel is at an angle designed to alter the flow to provide improved wear patterns to the valve seat body and valve member.

In certain embodiments, the valve seat insert is 2 pieces and at least one is formed from a ceramic material, a wear resistant steel, a polymer, or a combination thereof. Moreover, in embodiments, the valve seat insert is formed from a different material than the valve seat. In certain embodiments, the first piece of the valve seat insert includes a strike face at a top region opposite a bottom region and at least a portion of the strike face is formed by an insert positioned within a groove formed in the valve seat body. The second piece acts as a bore liner arranged within the bore. In various embodiments, a guide channel extends an angle of 0 degrees from axial direction and the guide channel serves as a guide extending longitudinally along at least a portion of the axial length, the guide including a recessed portion that receives at least a portion of a guide leg of the valve member. Furthermore, in embodiments, the second piece of the valve seat insert includes the guide channel extending at an angle of 1 to 89 degrees from axial direction longitudinally along at least a portion of the axial length. The guide channel is at an angle designed to alter the flow to provide improved wear pattern to the valve seat body and valve member.

In various embodiments, the first piece of the valve seat insert includes a first end having a first height proximate the bore and a second end having a second height, greater than the first height and distant from the bore. The portion of the axial length of the second piece of the valve seat insert is substantially equal to the first height and less than the second height. In certain embodiments, the valve seat includes a first body having a first diameter with at least a portion of the bore extending through the first body and a second body with a second diameter that is larger than the first diameter. Also included in embodiments is a tapered portion forming at least a portion of the strike face. Additionally, the valve seat may include a transition between the first body and the second body with the transition being a substantially right angle to form a shoulder at the second body. In certain embodiments, the valve seat also includes a sloped region of the valve seat insert, the sloped region substantially conforming to a tapered portion of valve seat. Furthermore, in embodiments, the valve seat includes a sloped top of the bore liner, an angle of the sloped top being substantially equal to the sloped region of the insert.

FIG. 1 is a schematic cross-sectional view of an embodiment of a pump assembly 100, which may also be referred to as a reciprocating pump assembly and/or a reciprocating pump. The pump assembly 100 may be utilized during hydraulic fracturing operations, among other operations, where a working fluid (e.g., fracturing fluid, slurry, etc.) is introduced into the pump and energy is added to the working fluid to increase a pressure of the working fluid. Fracturing fluid, by way of example only, may include corrosives and also particulates, such as sand or ceramics, which are utilized during fracturing operations. These corrosives and particulates cause erosion within the pump assembly 100, which may undesirably affect fracturing operations and lead to down times to replace various components. Additionally, the fracturing fluids may include corrosive acids and the like, which may wear down components of the pump assembly 100.

It should be appreciated that various components of the pump assembly 100 have been removed for clarity with the following discussion. For example, a power end has been removed in favor of focusing on the illustrated fluid end 102 of the pump assembly 100. The power end may include a crankshaft that is driven by an engine or motor to facilitate operations. The fluid end 102 includes a fluid end block 104 that may house one or more components discussed herein. A plunger rod 106 is driven (e.g., via the crankshaft) to reciprocate within the fluid end block 104 along a plunger axis 108. The plunger rod 106 is positioned within a bore 110 extending through at least a portion of the fluid end block 104. The illustrated bore 110 is arranged along the plunger axis 108 (e.g., first axis) and intersects a pressure chamber 112, which is arranged along a pressure chamber axis 114 (e.g., second axis), which is positioned substantially perpendicular to the plunger axis 108. It should be appreciated that the pump assembly 100 may include multiple plunger rod and pressure chamber arrangements, which may be referred to as a plunger throw. For example, the pump assembly 100 may be a triplex pump, quadplex pump, quintuplex pump, and the like.

The illustrated fluid end block 104 includes an inlet passage 116 and an outlet chamber 118, which are generally coaxial and arranged along the pressure chamber axis 114. In other words, the inlet passage 116 and the outlet chamber 118 are axially aligned with respect to one another and/or the pressure chamber 112. In various embodiments, fluid enters the pressure chamber 112 via the inlet passage 116, for example on an up stroke of the plunger rod 106, and is driven out of the pressure chamber 112 an outlet passage 120, for example on a down stroke of the plunger rod 106.

Respective valve assemblies 122, 124 are arranged within the inlet passage 116 and the outlet chamber 118. These valve assemblies 122, 124 are spring loaded in the illustrated embodiment, but it should be appreciated that such an arrangement is for illustrative purposes only. In operation, a differential pressure may drive movement of the valve assemblies. For example, as the plunger rod 106 is on the upstroke, pressure at the inlet passage 116 may overcome the spring force of the valve assembly 122, thereby driving fluid into the pressure chamber 112. However, on the down stroke, the valve assembly 122 may be driven to a closed positon, while the spring force of the valve assembly 124 is overcome, thereby enabling the fluid to exit via the outlet passage 120.

As will be described in detail below, the valve assemblies 122, 124 may include a valve seat face, which may include a strike face. The strike face may contact a sealing face of a valve member as the valve member transitions between an open position and a closed position. Due to the nature of the working fluid (e.g., corrosive and filled with particulates), wear may develop along the strike face, thereby reducing its sealing effectiveness. Moreover, in various embodiments, feature may be incorporated into a liner to facilitate pump operation. In certain embodiments, the features may correspond to guides formed within a liner and/or a portion of an insert to receive a portion of the valve member. The guides may prevent misalignment and/or rotation of the valve member during operation. Furthermore, in embodiments, the features may correspond to flow channels formed in the liner and/or at least a portion of the insert. The flow channels may also be integrated into embodiments that include the guides.

Figure 2:
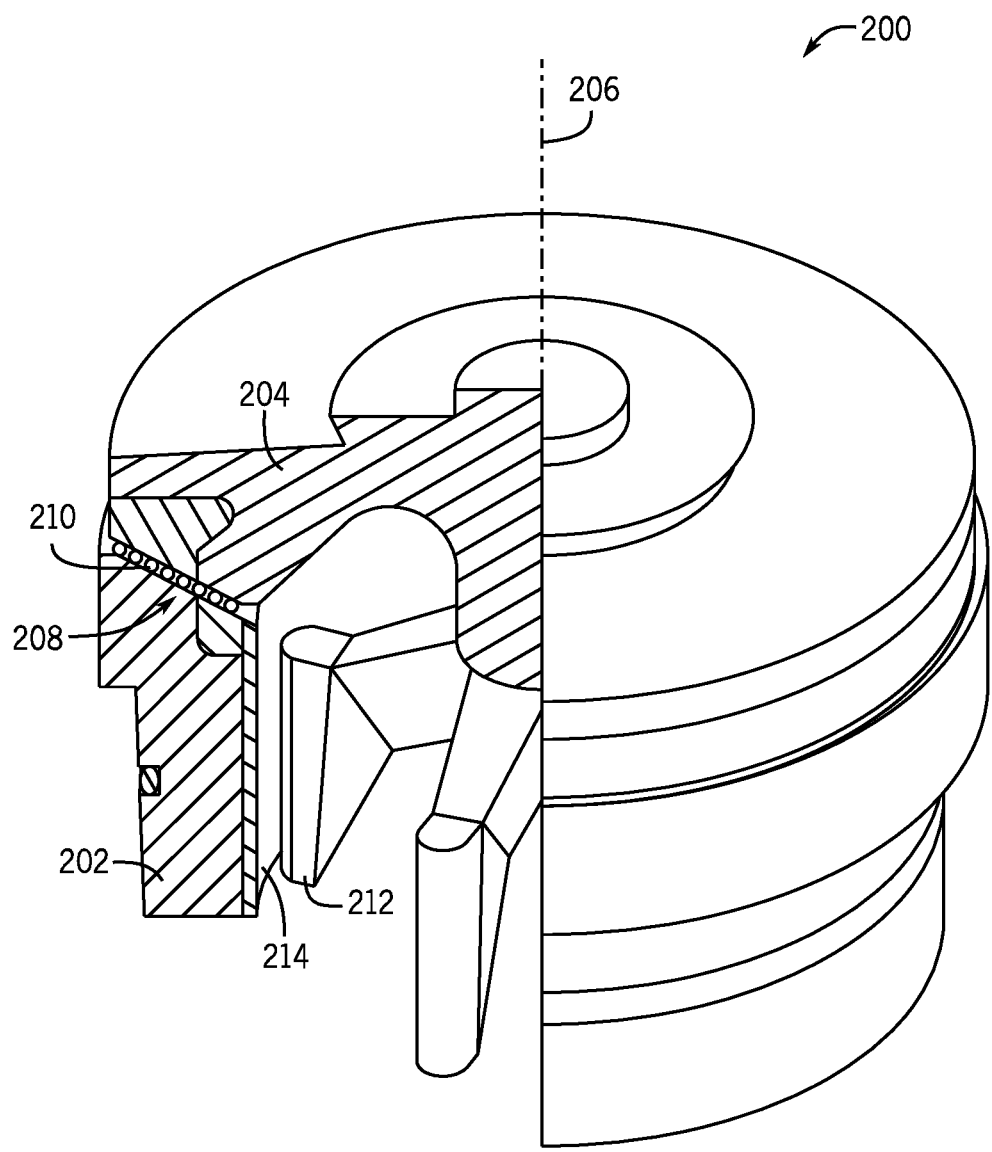
FIG. 2 is a schematic sectional view of an embodiment of a valve assembly, in accordance with embodiments of the present disclosure.

FIG. 2 is a schematic cut away view of an embodiment of a valve assembly 200, such as the valve assemblies 122, 124, which may be utilized with a pump assembly. The illustrated valve assembly 200 includes a valve seat 202 and a valve member 204. In operation, the valve member 204 reciprocates along a valve axis 206, which may correspond to the pressure chamber axis 114, such that the valve member 204 moves into and out of contact with the valve seat 202. In the illustrated embodiment, particulates 208 have accumulated along the valve seat 202, for example at a strike face 210 (e.g., contact face). Repeated contact from the valve member 204 may drive the particulates 208 into the strike face 210, causing scarring or other damage. Additionally, corrosive fluids may contact other portions of the valve seat 202, in addition to the strike face 210. Damage to the valve seat 202 may cause the sealing capability of the valve assembly 200 to degrade, thereby reducing the effectiveness of the pump assembly.

In various embodiments, guide legs 212 of the valve member 204 may also lead to damage to various portions of the valve seat 202. For example, in the illustrated embodiment, the guide legs 212 extend a bore 214 of the valve member 204. Due to the presence of the corrosive fluid and/or the particulates, damage may occur along the bore 214, such as scarring. As a result, the pump assembly may be taken out of service for repairs, which may be expensive and also contribute to non-productive time at the well site. Accordingly, embodiments of the present disclosure are directed toward systems and methods for forming improved valve seats, which may be part of valve assemblies.

Figure 3:
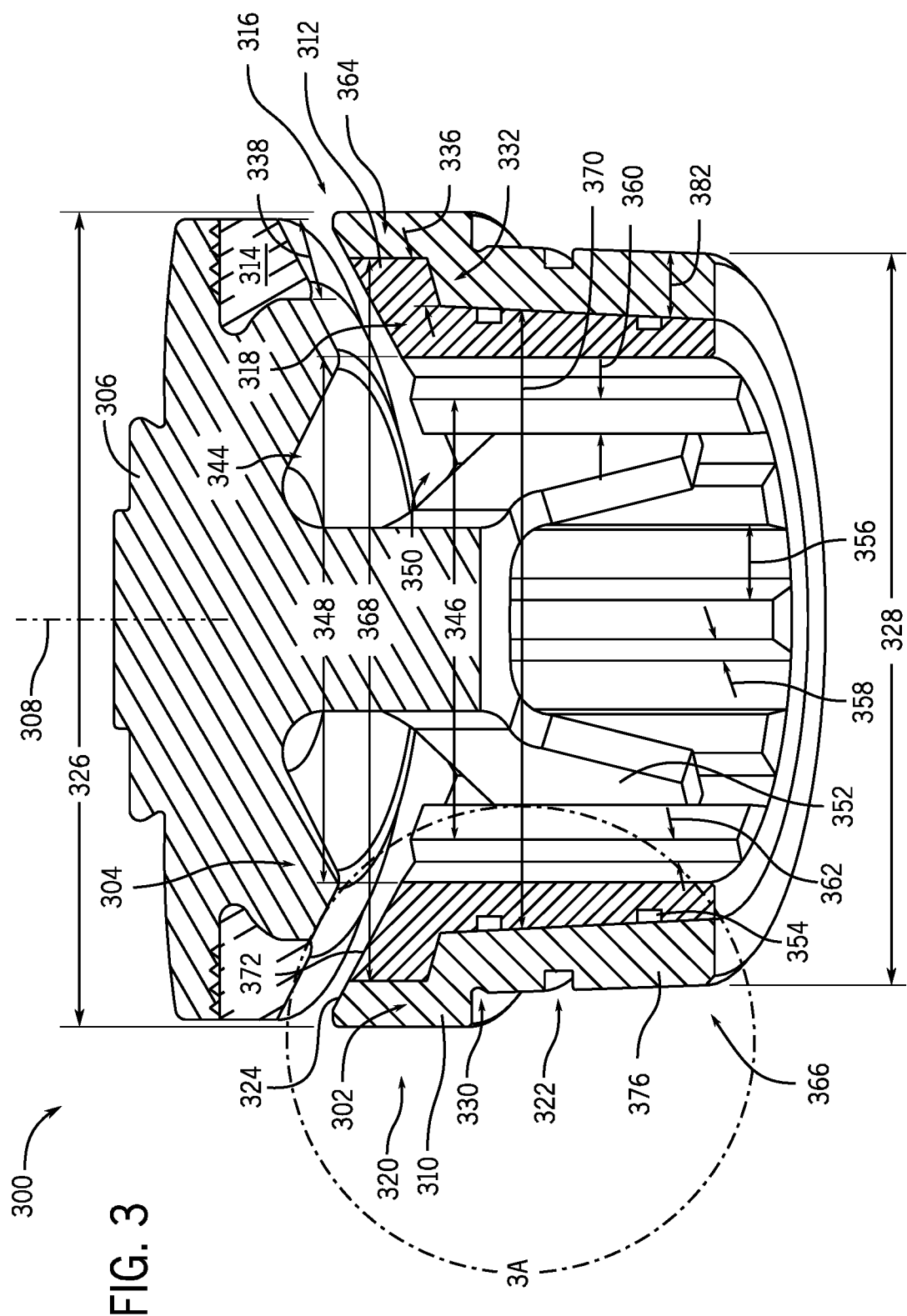
FIG. 3 is a cross-sectional side view of an embodiment of a valve assembly with an insert, in accordance with embodiments of the present disclosure.
Figure 3A:
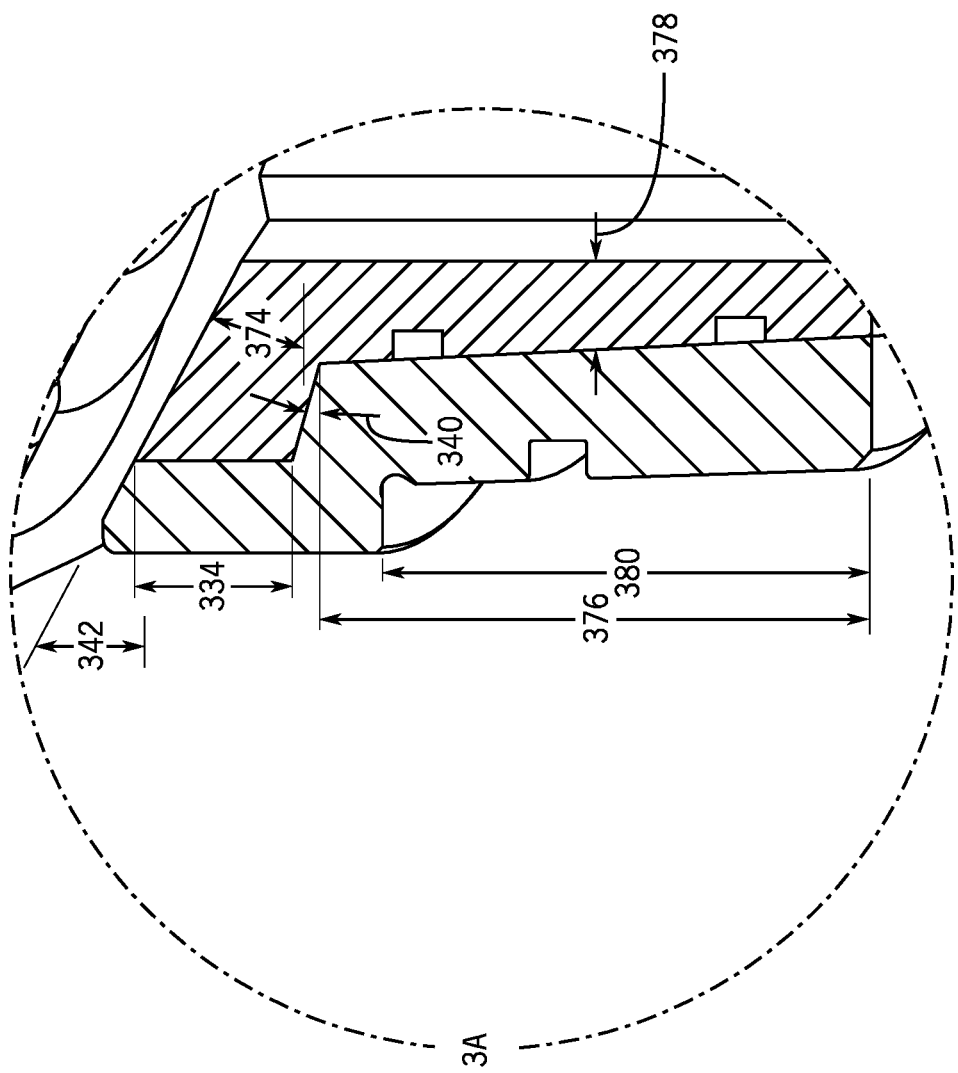
FIG. 3A is a detailed cross-sectional side view of an embodiment of a valve assembly with an insert, in accordance with embodiments of the present disclosure.

FIG. 3 is a cross-sectional side view of an embodiment of a valve assembly 300 with FIG. 3A being a detailed view of the same. The illustrated valve assembly 300, as will be described below, includes one or more features for improved operation over existing configurations. For example, an insert may be utilized to form at least a portion of the valve seat. The insert may be formed from a high hardness or corrosion resistant material, such as a metal, polymer, composite, or the like. The insert may be bonded to a valve seat to form an integral component, or in embodiments, may be a removable component. As will be described below, various features of the insert may improve operation of the valve assembly 300, such as by guiding reciprocating motion of the valve member, reducing the likelihood of failure, and/or improving flow characteristics.

The illustrated embodiment includes a valve seat 302 with a bore 304 extending therethrough. A valve member 306 is positioned to reciprocate within the bore 304 along an axis 308. The illustrated valve seat 302 includes a first valve seat body 310 that is arranged radially outward from and circumferentially around a second valve seat body 312, which as will be described below may be formed from an insert component. In operation, changes in fluid pressures may drive the valve member 306 in a first direction out of contact and away from the valve seat 302 and in a second direction into contact and toward the valve seat 302. As will be appreciated, the valve member 306 may include a sealing element 314 that contacts a strike face 316 of the valve seat 302. In various embodiments, as will be described, at least a portion of the strike face 316 may be formed by an insert 318 (e.g., seat insert, liner insert, valve seat insert, etc.).

In various embodiments, the valve seat 302 includes an upper region 320 and a lower region 322. The upper region 320 and the lower region 322 may also correspond to components with respect to the first valve seat body 310. The upper region 320 may also be referred to as a top region and includes the strike face 316. The illustrated upper region 320 has a slanted face 324, which forms at least a portion of the strike face 316, and has an upper region outer diameter 326 that is larger than a lower region outer diameter 328. A transition 330 between the upper region 320 and the lower region 322 may be used to seat the valve seat 302 within the pump assembly 100. It should be appreciated that the illustrated configuration of the transition 330, which includes a notch but a substantially flat shoulder of the upper region 320 is for illustrative purposes and the shoulder may be slanted in other embodiments. While the illustrated transition 330 is substantially 90 degrees, it should be appreciated that in other embodiments the transition 330 may be at different angles to provide a sloping change between the upper region 320 and the lower region 322.

In FIG. 3, the insert 318 is arranged, at least partially, within a groove 332 formed in the upper region 320. The groove 332 is an annular groove that extends about the axis 308 and extends to the bore 304. In this embodiment, the groove 332 includes a groove depth 334, which may be variable along a groove radial length 336. That is, the groove depth 334 may be deeper at one end than at another end. As noted above, the groove radial length 336 is less than an upper region radial length 338. In other words, there is materially radially outward from the groove 332. It should be appreciated that while the respective lengths 336, 338 are illustrated at an angle, which will be described below, in other embodiments the groove 332 may be formed differently such that the lengths may be represented by horizontal lines (e.g., lines that are perpendicular to the axis 308). In various embodiments, the groove is arranged at groove angle 340, which may be substantially equal to an upper region angle 342, however, in various embodiments the groove angle 340 may be larger than or smaller than the upper region angle 342. The insert, as shown, is adapted to be positioned within the groove 332 to form at least a portion of the strike face 316.

The illustrated embodiment further shows the insert 318 arranged within the bore 304 and forming an insert bore 344, which has a small diameter than the bore 304. The embodiment shown in FIG. 3 includes two different bore diameters for the insert 318. An inner insert diameter 346 is less than an outer insert bore diameter 348. The disparity between the diameters 346, 348 is due to the channels 350 (e.g., guide channels) formed in the insert 318. The guide channels 350 receive legs 352 of the valve member 306, thereby facilitating and guiding the reciprocal motion along the axis 308. That is, the legs 352 may be arranged within one or more guide channels 350. Such an arrangement blocks twisting or rotation of the valve member 306 due to the walls 354 between adjacent guide channels 350. As will be appreciated, the walls 354 may be the remnant of the inner bore diameter 348, for example, in embodiments where the guide channels 350 are machined into the insert 318. In various embodiments, the guide channels 350 extend circumferentially about the axis 308. However, it should be appreciated that the guide channels 350 may be positioned at specific locations, for example, to facilitate with installation of the valve member 306. For example, if a limited number of guide channels 350 are included (e.g., a number equal to a number of legs 352), then there may be a limited number of configurations for installation of the guide member 306.

Each of the channels 350 includes a channel width 356 (e.g., circumferential length about the axis 308) and a channel depth 358 (e.g., radial depth extending outward from the axis 308). It should be appreciated that the channels 350 may all have equal widths 356 and depths 358 and/or different channels may have different widths 356 and depths 358. That is, a first channel may be wider and/or deeper than a second channel. For example, configurations may provide channels that are wide enough to receiver the legs while other channels are not wide enough to receive the legs. Furthermore, embodiments may include channels that are deep enough to receive the legs and other channels that are not deep enough to receive the legs. These different channels may be equally positioned about the circumference of the insert bore 344 and/or may be particularly spaced at different regions. Accordingly, it should be appreciated that the location of the illustrated channels 350 in FIG. 3 are for illustrative purposes, but different configurations may be provided.

Each of the walls 354 includes a wall width 360 (e.g., circumferential length about the axis 308) and a wall depth 362 (e.g., thickness). It should be appreciated that the walls 354 may all have equal widths 360 and depths 362 and/or different walls may have different widths 360 and depths 362. That is, a first wall may be wider and/or thicker than a second wall. For example, configurations may provide walls that provide larger spacing between adjacent channels. Furthermore, the walls 354 may be positioned to provide additional small flow paths or a smaller number of large flow paths (e.g., paths within the channels 350). Accordingly, it should be appreciated that while the illustrated configuration includes walls that are substantially equal, different configurations are considered within the scope of the present disclosure.

The insert 318 is arranged within the bore 304 and in contact with the valve seat body 310 (e.g., in contact with both the upper region 320 and/or the lower region 322). In this embodiment, the insert 318 includes an upper insert region 364 and a lower insert region 366. The upper insert region 364 is arranged within the groove 332 and has a larger upper insert region diameter 368 than a lower insert region diameter 370 that is located along the bore 304. The upper insert region 364 further includes a slanted insert face 372, which is arranged at an insert face angle 374 that may substantially conform to the groove angle 340 and/or the upper region angle 342. Accordingly, at least a portion of the slanted insert face 372 may form at least a portion of the strike face 316.

In various embodiments, the lower insert region diameter 370 is variable along a lower insert region length 376. As noted, the lower insert region diameter 370 refers to an outer diameter, as opposed to the insert bore 344. In this embodiment, the lower insert region diameter 370 decreases along the length 376 from the upper insert region 364 down in an axially downward direction away from the valve member 306. In other words, an insert thickness 378 decreases along the length 376 of the insert 318, specifically along the lower insert region 366. It should be appreciated that the corresponding bore 304 may also be tapered in order to accommodate and mate with the 318. That is, a lower region length 380 may have a mating profile that has an increasing thickness 382 that corresponds to the decreasing thickness 378 of the insert 318. It should be appreciated that the length 376 may be less than, greater than, or equal to the lower region length 380. Moreover, each of the thicknesses 378, 382 may be substantially constant along the respective lengths 376, 380.

In operation, the insert 318 may be installed within the valve seat 302 and/or be integrally formed into the valve seat 302. For example, in embodiments, portions of the valve seat 302 and/or the insert 318 may be formed from different materials. For example, the exterior portions of the valve seat 302 (e.g., the portion that includes groove 332) may be formed from a standard or traditional metal, such as a carbon steel. However, in various embodiments, the insert 318 is formed from a high hardness material, such as a ceramic, composite, high strength metal, or the like. The insert 318 may be mechanically coupled to the valve seat 302, for example, via press fitting or other mechanical means. The insert 318 may also be integrally formed into the valve seat 302, for example, using hot isostatic pressing. As a result, the valve seal 302 may be prepared with fewer costs because the entire structure is not formed from the high hardness/ high strength material, which may be prohibitively expensive, but rather the strength is focused on areas that are likely to experience the greatest wear and/or corrosion.

Figure 4:
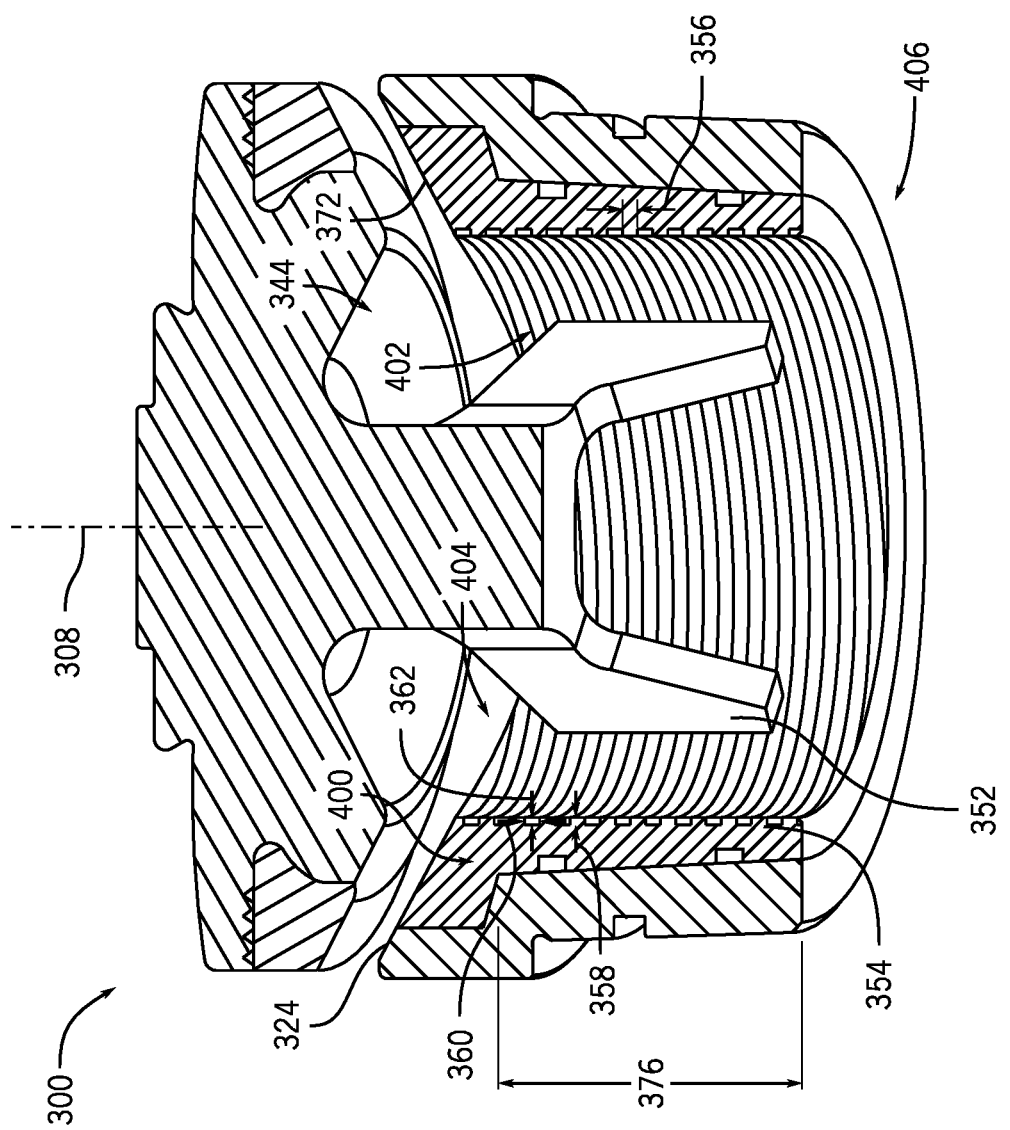
FIG. 4 is a cross-sectional side view of an embodiment of a valve assembly with an insert, in accordance with embodiments of the present disclosure.

FIG. 4 is a cross-sectional view of an embodiment of the valve assembly 300 where the insert 318 has been replaced with an insert 400 having a flow channels 402 formed along the insert length 376. FIGS. 3 and 4 may share certain features, which are not repeated for conciseness. In this embodiment, the insert length 376 extends from an end 404 of the slanted insert face 372 to an insert bottom 406. The illustrated flow channels 402 are different from the channels 350 illustrated in FIG. 3 in that the flow channels 402 of FIG. 4 are a continuous helical pattern extending along the length 376. In the illustrated embodiment, the flow channels 402 extend along the length 376 in a pattern similar to a screw or threads, which may be described as a removal of segment of material at a point revolved about the axis 308 as the point also moves along the axis 308. While the illustrated embodiment includes the flow channels 402 as a continuous pattern, it should be appreciated that the flow channels 402 may not be a continuous helical pattern, but may also include multiple different helical patterns, different circular patterns extending different lengths, varying pitches of the helical pattern, and the like.

The flow channels 402 shown in FIG. 4 include the channel width 356 described in FIG. 3, however, in this configuration, the width 356 may not be a circumferential width but rather a lateral span extending between the walls 354. Furthermore, the illustrated flow channels 402 also extend radially outward into the insert 400 by the channel depth 358. As noted above, the channels 402 may not have equal widths 356 and depths 358. Furthermore, the illustrated walls 354 may have variable wall widths 360 and wall depths 362, also the walls 354 are illustrated as uniform and continuous in the embodiment of FIG. 4.

FIG. 4 also illustrates that the flow channels 402 are arranged such that the legs 352 are positioned radially inward of the walls 354. In other words, the legs 352 do not slide within the flow channels 402 due to the helical orientation of the flow channels 402. However, it should be appreciated that the flow channels 402 of FIG. 4 may be integrated into the configuration shown in FIG. 3, for example, by cutting channels into the walls 354.

In operation, the flow channels 402 may receive fracturing fluid, or any other fluid being utilized by the pump assembly 100, to direct flow through the bore 304. For example, the flow channels 402 may provide an increased cross-sectional flow area for at least a portion of the insert bore 344, which may reduce fluid velocity. Furthermore, increasing the flow area may also enable additional fluid flow without increasing pressures or fluid velocities.

In embodiments, though not illustrated in FIG. 4, there may be an additional liner positioned radially inward of the insert 400 that covers the flow channels 402. That is, the legs 352 may be positioned in contact with the additional liner within the insert 400. In embodiments, the liner may also cover at least a portion of the slanted insert face 372.

Figure 5:
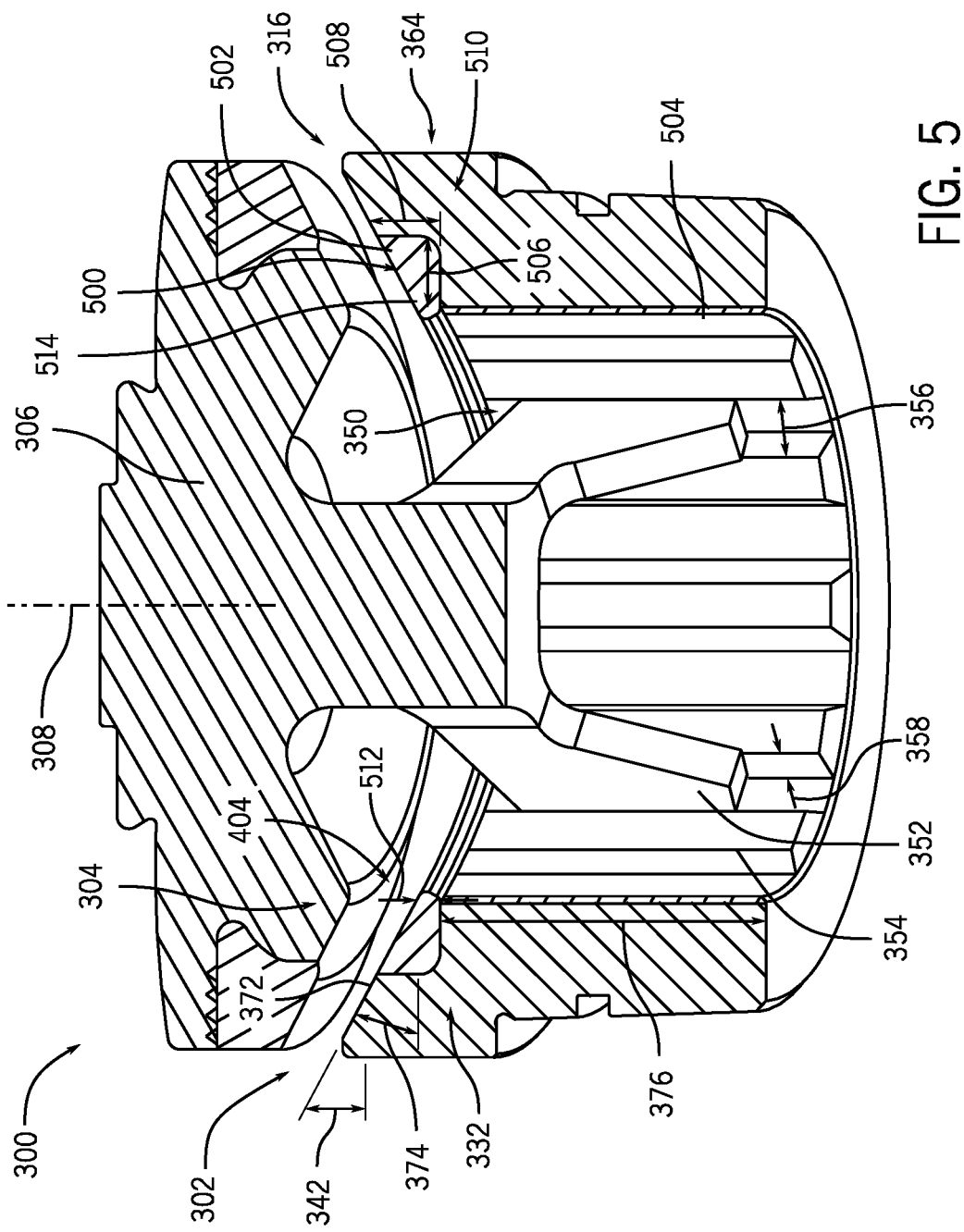
FIG. 5 is a cross-sectional side view of an embodiment of a valve assembly with a two piece insert, in accordance with embodiments of the present disclosure.

FIG. 5 is a cross-sectional view of an embodiment of the valve assembly 300 including a two part insert 500 formed by a strike face insert 502 and a liner insert 504, which in this configuration are separate components. FIGS. 3 and 4 share certain features with FIG. 5, in these embodiments, and as a result may not be repeated for conciseness. In various embodiments, the strike face insert 502 and the liner insert 504 may be formed from different materials, however, in other embodiments, the strike face insert 502 and the liner insert 504 may be formed from the same material. In the illustrated embodiment, the strike face insert 502 is arranged within the groove 332 and forms at least a portion of the strike face 316. As noted above, the strike face insert 502 may share one or more components with the upper insert region 364. For example, the strike face insert 502 includes the slanted insert face 372 arranged at the insert face angle 374, which may substantially correspond to the upper region angle 342. However, it should be appreciated that the respective angles 374, 342 may be different in other embodiments. In this configuration, the strike face insert 502 includes the end 404, which may form at least a portion of the bore 304.

The illustrated strike face insert 502 extends radially for a depth 506 and a first height 508 at a mating end 510 opposite the end 404 which extends for a second height 512. As shown, the first height 508 is greater than the second height 512, thereby forming the downwardly sloping face 372. In the illustrated embodiment, the end 404 is not planar or flat, but rather, includes a bump 514 that extends radially farther toward the axis 308. It should be appreciated that this bump 514 may be omitted in other embodiments. In this embodiment, the strike face insert 502 may be mechanically coupled to the valve seat 302 (e.g., press fit, welded, fastened, etc.) or may be otherwise coupled to the valve seat 302, for example via a chemical process as described above.

Further illustrated is the liner insert 504, which is arranged axially lower than the strike face insert 502 in the illustrated embodiment. In other words, the illustrated liner insert 504 does not overlap the strike face insert 502 shown in FIG. 5. It should be appreciated that other configurations may be utilized where at least a portion of the strike face insert 502 is overlapped by at least a portion of the liner insert 504. In various embodiments, the liner insert 504 shares certain features with the insert 318 shown in FIG. 3, such as inclusion of the channels 350 extending along a lower insert length 376. The illustrated channels 356 may serve as guides for the legs 352 to facilitate axial movement of the valve member 306 along the axis 308. In various embodiments, as noted above, the channels 350 are separated by the walls 354. The channels 350 include respective channel widths 356 and channel depths 358, which may be substantially equal or may be different, as noted above. By way of example, different channels 350 may be sized with particularly selected dimensions in order to receive the legs 352 while other channels 350 have different particularly selected dimensions to serve as fluid flow paths that do not receive the legs 352. In this manner, flow patterns within the bore 304 may be adjusted.

As noted above, the illustrated liner insert 504 is shown coupled to the bore 304 where both the bore 304 and the liner insert 504 are shown having substantially parallel side walls, rather than the slanted or tapered walls shown in FIG. 3. As noted above, different embodiments may incorporate other features, such as included slanted sidewalls for the insert liner 504 and/or having parallel sidewalls for the embodiment illustrated in FIG. 5. The liner insert 504 may be coupled to the bore 304 using a mechanical fastening method, such as a press fit or weld, or by other methods, such as manufacturing methods that integrally bond the materials.

Figure 6:
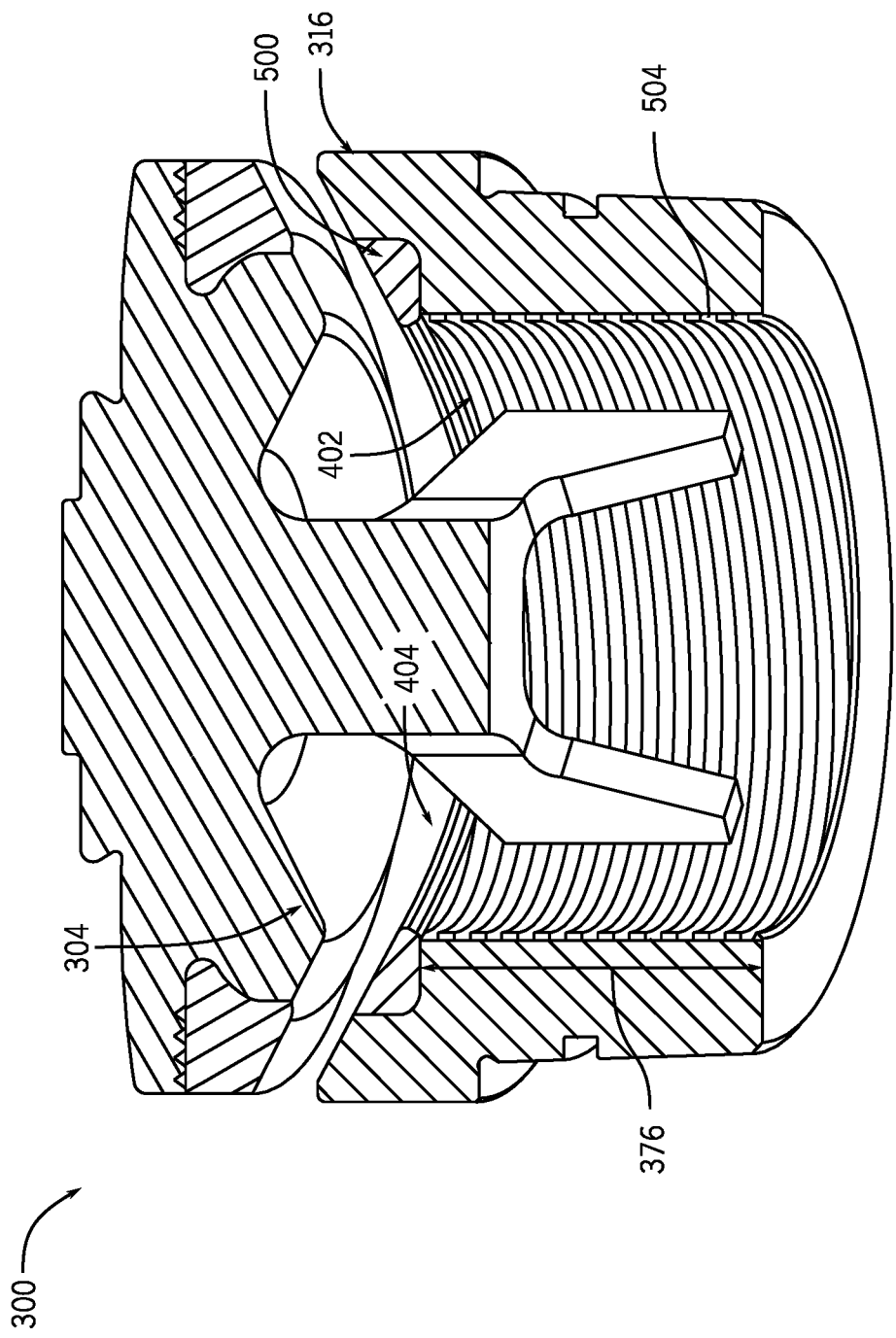
FIG. 6 is a cross-sectional side view of an embodiment of a valve assembly with a two piece insert, in accordance with embodiments of the present disclosure.

FIG. 6 is a cross-sectional view of an embodiment of the two-part insert 500 where the insert liner 504 has been modified to include the flow channels 402. FIGS. 3-5 share certain features with FIG. 6 and as a result may not be repeated for conciseness. As described above with respect to FIG. 4, the illustrated insert liner 504 may share certain features as those described in FIG. 5, with a difference being that the channels 350 are replaced with the flow channels 402, which are illustrated in a helical pattern to adjust fluid flow within the bore 304.

In this embodiment, the flow channels 402 are arranged proximate the end face 404 and extend along the length 376. However, as noted above, it should be appreciated that the flow channels 402 may be limited to a certain area or range of the liner insert 504. Furthermore, in various embodiments, the flow channels 402 may be continuous or be segmented, which may enable different adjustments to the flow characteristics of the bore 304.

As noted above, embodiments of the present disclosure are directed toward incorporating harder and/or stronger materials into valve seats and/or bores in order to improve effective life. For example, traditional valve seats may be formed by an alloy steel. Repeated contact with a valve member, which may lead to wear and erosion, especially when utilized with environments with corrosive fluids and/or particulates in the fluid. Embodiments of the present disclosure incorporate high strength materials, such as ceramic materials, resistant steels, or polymers, into the valve seats at areas where contact is made with the valve member. These materials may be incorporated in a variety of ways, such as bonding, press fitting, sintering, or a combination thereof. As a result, a majority of the valve seat may be formed from cheaper materials, such as alloy steels, with more expensive materials being focused at the areas of contact.

Figure 7:
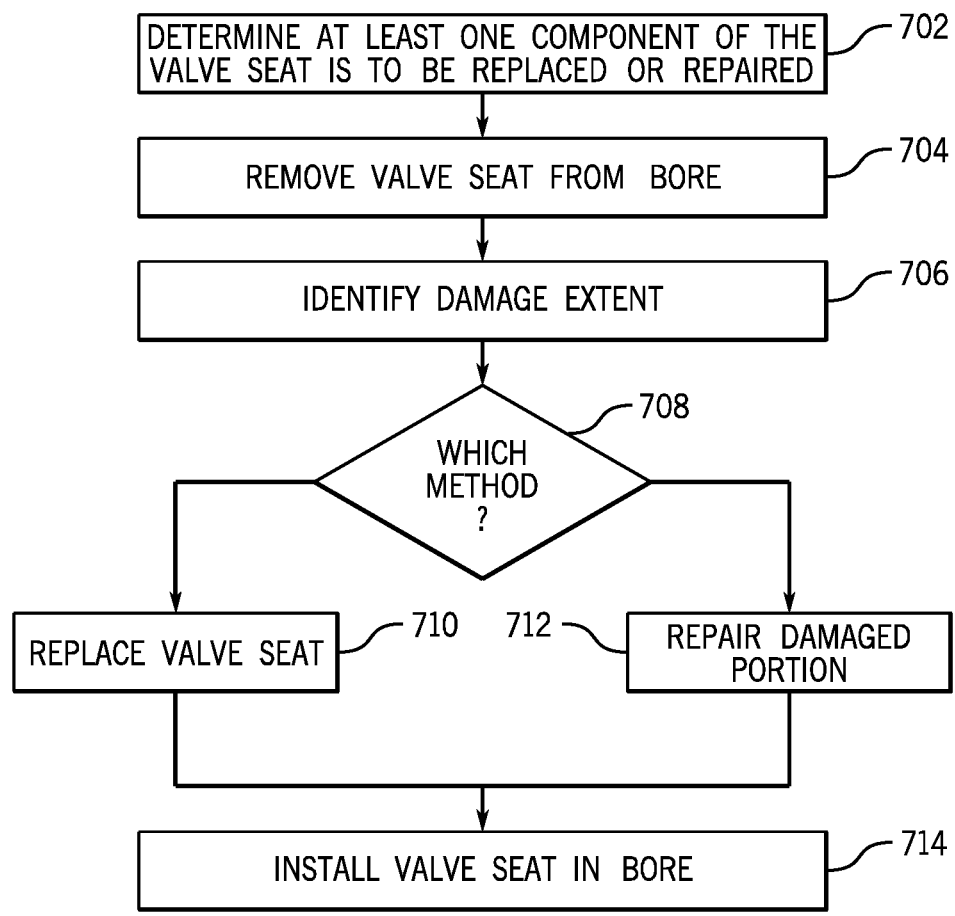
FIG. 7 is a flow chart of an embodiment of a method for repairing or replacing a valve assembly, in accordance with embodiments of the present disclosure.

FIG. 7 is a flow chart for an embodiment of a method 700 for repairing and/or replacing a valve seat. It should be appreciated for this method and all other methods herein that there may be additional or fewer steps. Moreover, the steps may be performed in any order, or in parallel, unless otherwise specifically stated. In this example, at least one component of a valve is determined to be replaced or repaired 702. For example, leakage may be detected, which may be indicative of a failure related to the valve seat, such as corrosion or erosion. The valve seat may be removed from a bore, such as a bore of a pumping assembly 704. In various embodiments, the valve seat is associated with a valve assembly, and removal may enable inspection of various components of the valve assembly. The extent of damage may be evaluated 706, which may be useful in determining how to proceed with repairs or replacements. For example, a determination may be made whether or not to replace a valve seat 708. The determination may be based on a quantity or metric associated with damage to the valve seat, a location of the damage, material properties of the valve seat, or any combination thereof. If damage exceeds a threshold, which may be related to time, cost, or the like, then the valve seat is replaced 710. If damage does not exceed the threshold, the valve seat is repaired 712. Thereafter, the valve seat may be reinstalled 714. In this manner, pumping operations may proceed. It should be appreciated that, in certain embodiments, the valve seat may be replaced with a new valve seat, to quickly resume operations, while the old valve seat is repaired. Then, the repaired valve seat may be used in subsequent operations. This may reduce the number of wasted material while also enabling rapid replacement during pumping operations.

The foregoing disclosure and description of the disclosed embodiments is illustrative and explanatory of the embodiments of the disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A valve assembly for a fracturing pump, comprising:
   a valve seat having a bore, the valve seat having an upper region forming at least a portion of a strike face;
   a fluid end block having a passage supporting the valve seat;
   a groove formed in the upper region of the valve seat;
   a valve seat insert positioned within the bore of the valve seat, the valve seat insert comprising:
      a body portion extending at least a portion of a bore length;
      an insert bore extending through the body portion;
      an upper insert region, at least a portion of the upper insert region positioned within the groove, the upper insert region forming at least a portion of the strike face; and
      a channel formed in the body portion, the channel extending radially into the body portion toward the bore of the valve seat and having a channel diameter larger than an insert bore diameter; and
   a valve member positioned to reciprocate within the bore of the valve seat, the valve member moving between an open position and a closed position, wherein at least a portion of the valve member engages at least a portion of the strike face in the closed position.

2. The valve assembly of claim 1, wherein the channel is axially aligned with a movement axis of the valve member.

3. The valve assembly of claim 1, further comprising a second channel, wherein the first channel and the second channel are positioned to receive legs of the valve member.

4. The valve assembly of claim 1, wherein the channel is helically shaped.

5. The valve assembly of claim 1, wherein the valve insert is a unitary piece formed from at least one of a ceramic, a wear resistant steel, a polymer, or a combination thereof.

6. The valve assembly of claim 1, further comprising:
   a lower insert region, coupled to the upper insert region, and extending along the bore length of the valve seat, wherein a bore diameter decreases along the bore length and a lower insert region outer diameter decreases along a lower region length.

7. The valve assembly of claim 1, wherein the upper insert region further comprises:

a slanted insert face, the slanted insert face arranged at an insert angle that substantially conforms with a strike face angle, the slanted insert face forming at least a portion of the strike face.

8. The valve assembly of claim 1, wherein the valve seat insert is formed from a different material than the valve seat.

9. A valve seat for use in a fracturing pump, comprising:
a first body, including a groove formed in the first body and a tapered portion extending from the groove and along a first longitudinal bore extending through the first body, a radial thickness of the tapered portion increasing along the first longitudinal bore;
a second body positioned at least partially within the groove, the second body including a slanted face that substantially conforms to the tapered portion; and
a third body, arranged within the first longitudinal bore, the third body extending along at least a portion of a first bore length, the third body having a second longitudinal bore coaxial with the first longitudinal bore, and a second bore diameter that is less than a first bore diameter.

10. The valve seat of claim 9, wherein the second body and the third body are integrally connected and formed from a first material different than a second material of the first body.

11. The valve seat of claim 9, wherein the third body further comprises:
a channel extending along at least a portion of a third body length, the channel having a channel depth extending radially outward toward the first body.

12. The valve seat of claim 11, wherein the channel is positioned substantially parallel to a first body axis.

13. The valve seat of claim 11, wherein the channel is part of a plurality of channels, the plurality of channels being arranged circumferentially about the third body such that adjacent channels of the plurality of channels are separated by respective walls, wherein each of the plurality of channels has a different channel diameter than respective wall diameters of each of the walls.

* * * * *